(12) United States Patent
Huacuja

(10) Patent No.: US 12,648,674 B2
(45) Date of Patent: Jun. 9, 2026

(54) METHOD AND APPARATUS FOR PREPARING AND SERVING A DESERT

(71) Applicant: Rafael Huacuja, Laredo, TX (US)

(72) Inventor: Rafael Huacuja, Laredo, TX (US)

( * ) Notice: Subject to any disclaimer, the term of this patent is extended or adjusted under 35 U.S.C. 154(b) by 0 days.

(21) Appl. No.: 18/671,796

(22) Filed: May 22, 2024

(65) Prior Publication Data

US 2025/0359709 A1      Nov. 27, 2025

Related U.S. Application Data

(60) Provisional application No. 63/453,845, filed on Mar. 22, 2023.

(51) Int. Cl.
*A47J 47/02*          (2006.01)
(52) U.S. Cl.
CPC ..................................... *A47J 47/02* (2013.01)
(58) Field of Classification Search
CPC ........... A21B 3/137; A21B 3/135; A21B 3/13; A21B 3/133; A21B 3/131; A47J 37/01; A47J 27/04; A47J 27/05; A47J 36/02; Y10S 99/15; Y10S 249/01; B65D 21/086; B65D 2581/3405; B25D 3/24

USPC ... 220/573.1, 506, 573.4, 23.83, 912, 23.87; 99/DIG. 15, 413, 426
See application file for complete search history.

(56) References Cited

U.S. PATENT DOCUMENTS

| | | | | |
|---|---|---|---|---|
| 476,340 | A * | 6/1892 | Wagandt ................... | A21B 3/13 |
| | | | | D7/555 |
| 2,125,793 | A * | 8/1938 | Linderman, Jr. ........ | B65D 1/34 |
| | | | | 220/574 |
| 8,534,188 | B1 * | 9/2013 | Winfield ................ | A21B 3/137 |
| | | | | 99/357 |
| 11,266,153 | B1 | 3/2022 | Wilkinson | |
| 2004/0216620 | A1 * | 11/2004 | Quiggins ................ | A47J 36/08 |
| | | | | 99/413 |
| 2014/0290069 | A1 * | 10/2014 | White, III ................ | B26D 3/24 |
| | | | | 30/114 |
| 2021/0227836 | A1 | 7/2021 | Murphy | |

* cited by examiner

*Primary Examiner* — King M Chu
(74) *Attorney, Agent, or Firm* — Daniel Polk

(57) ABSTRACT

The present invention is directed to an apparatus for demolding, slicing, serving, handling, and refrigerating a finished flans desert product. The apparatus allows for the creation of a commercially viable desert product which has consistent form, shape, color, and quality. Once refrigerated, the desert product can be shipped with minimal damage to the consistency, color, and form of the desert product. The apparatus can be used to create other commercial quality food and desert products.

5 Claims, 28 Drawing Sheets

Flan Cubby's Disposable Version

Non-disposable version of Flan Cubby

Non-disposable version of Flan Cubby

Section of non-disposable Flan Cubby

Non-disposable Tray (1A)

Non-disposable Tray (1A)

Non-disposable Ring (2A)

Non-disposable Ring (2A)
Section H-H

Non-disposable Container (3A)

Non-disposable Lid (4A)

4a1

4A

4a1

4a3

Non-disposable Lid (4A)

Non-disposable tray(1A) attached to container(3A) and ring(2A) placed inside tray Ring(2A) and tray(1A) placed inside container(3A)

Ring(2A) and tray(1A) locked inside container(3A)

Locking Mechanism between tray(1A) and container(3A)

Disposable Version of Flan Cubby

Flan Cubby's Disposable Version

Section of Flan Cubby's Disposable Version

Disposable Tray

Disposable Plate (5B)

Disposable Plate (5B)

Disposable Ring (2B)

Disposable Container (3B)

Disposable Container (3B)

Disposable Lid (4B)

Disposable Version of Flan Cubby

Non-disposable version of Flan Cubby

METHOD AND APPARATUS FOR PREPARING AND SERVING A DESERT

CROSS REFERENCE TO RELATED APPLICATIONS

This application claims the benefit of provisional patent application No. 63/453,845, filed on Mar. 22, 2023.

BACKGROUND OF THE INVENTION

The present invention relates to baking utensils. More particularly, it is directed to an improved apparatus for preparing, storing, refrigerating, and shipping a flan desert product, and related method of use.

Flan preparation is generally characterized by blending milk, eggs, sugar, and vanilla; which are then poured into the mold and baked. The flan preparation (the flan being a custard like desert product of gelatinous consistency) is allowed to cool and then refrigerated for several hours. Once the flan is set, the edge of the flan is loosened from the mold with a knife, a plate is placed on top of the mold and flipped over. The flan slowly lowers or drops onto the plate, the mold is raised, and solid caramel that precipitates from the preparation process has now turned into golden syrup that flavors the flan, and spreads on the plate.

Most flan preparation pans do not separate the flan's syrup, nor do they keep the flan in place. Flans tend to rest in a puddle of caramel, and slide from side to side inside of their containers. This excess of caramel stains the pale yellow bottom of the flan. It is also very difficult to slice the flan in equal parts, and to use a spatula to serve the slices from these types of containers. This limits the production of flans due to the difficulty of transporting it and serving it without the flan becoming damaged.

BRIEF SUMMARY OF THE INVENTION

The present invention is directed to an apparatus for demolding, slicing, serving, handling, and refrigerating a finished flans desert product. The apparatus allows for the creation of a commercially viable desert product which has consistent form, shape, color, and quality. Once refrigerated, the desert product can be shipped with minimal damage to the consistency, color, and form of the desert product. The apparatus can be used to create other commercial quality food and desert products.

The inventive apparatus allows the user to demold a finished flans, retain a small amount of caramel on a tray, spill the excess into the container (which contains the excess caramel syrup to prevent it from discoloring the flan prior to consumption, a common problem), slice the flans custard portion into several same size slices, and serve it. The caramel inside the container can be recovered by removing the tray, setting it aside, and pouring the caramel out via an arrangement of orifices formed in the container. If the flan is not meant to be consumed immediately after it is demolded, it can be refrigerated and transported inside the container of the apparatus, without resting in a pool of caramel, nor wobbling inside the utensil, thereby preserving its quality.

There are two versions of this invention: a non-disposable version and a disposable version. The non-disposable version is made up of a set of four parts that complement each other: a tray, a ring, a container and a lid. The disposable version is made up of the same parts, except for the addition of a plate that serves as the tray's bottom panel. The disposable version may be used to store and transport a flans product for commercial purposes.

BRIEF DESCRIPTION OF THE DRAWINGS

Non-Disposable Version

Disposable Version

Figure 17:
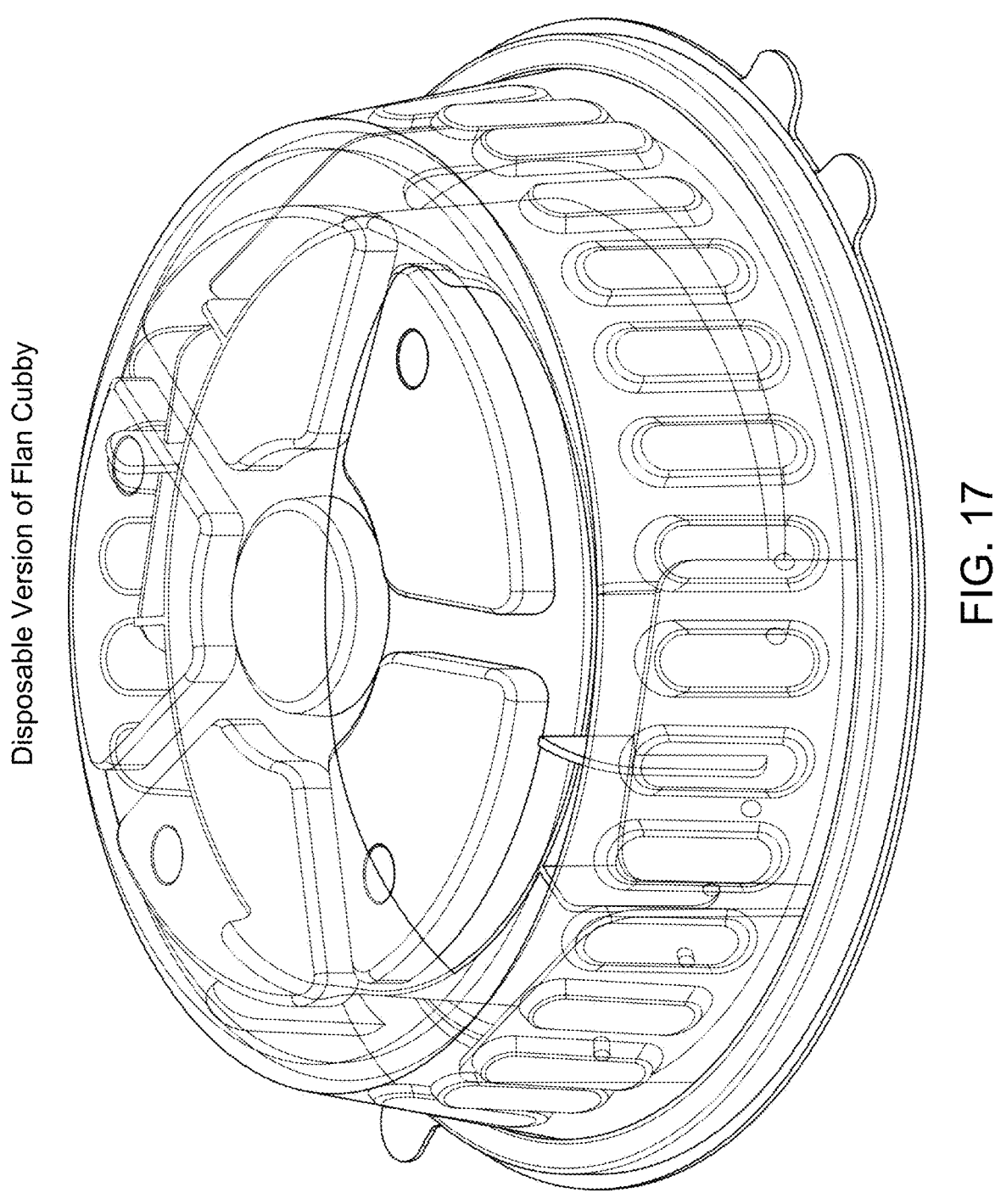

FIG. 17 shows an exploded exterior perspective view of the disposable version.

Figure 18:
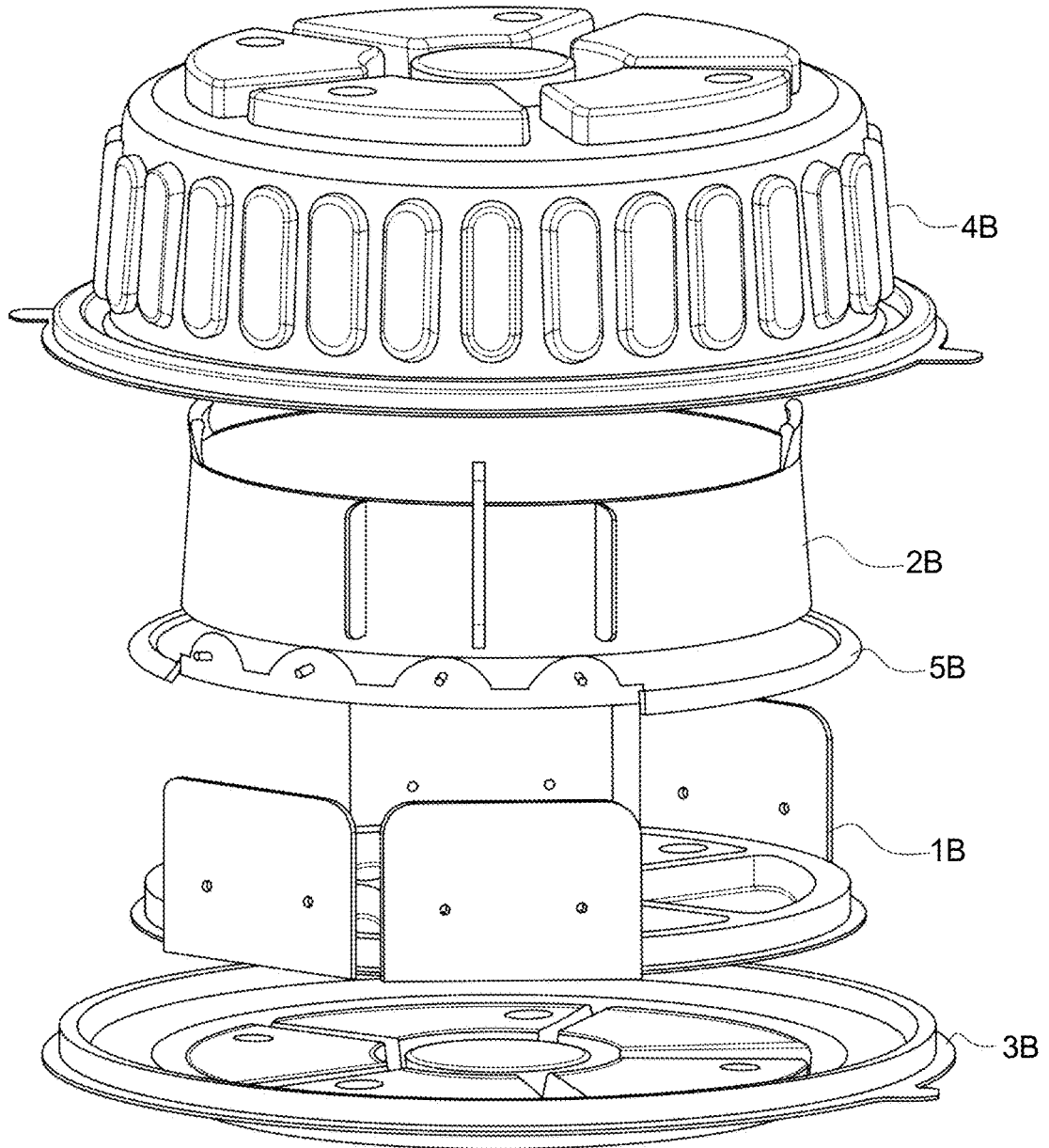

FIG. 18 shows how its five components assemble.

Figure 19:
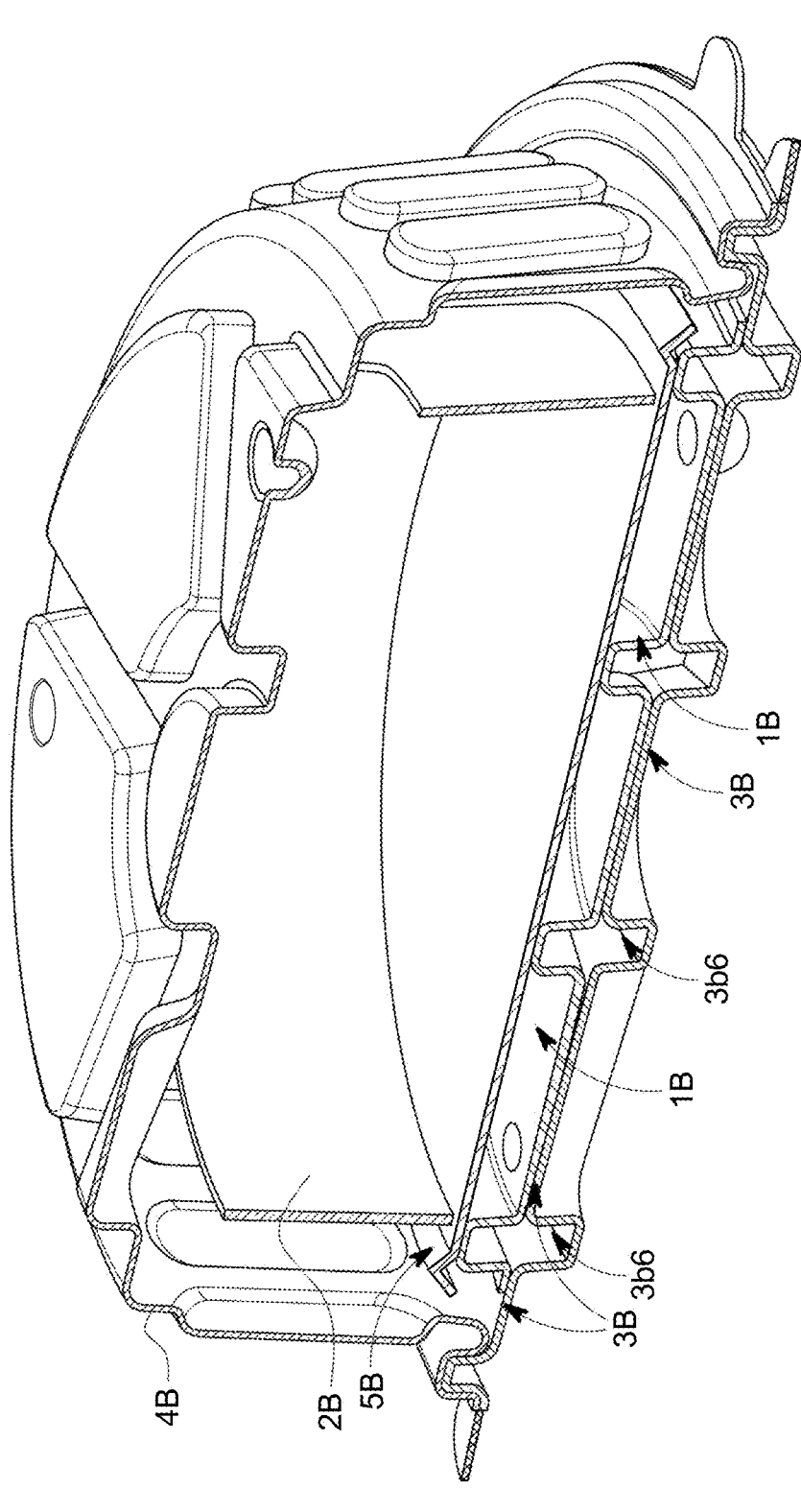

FIG. 19 is a cross-section that shows the disposable version assembled.

Figure 20:
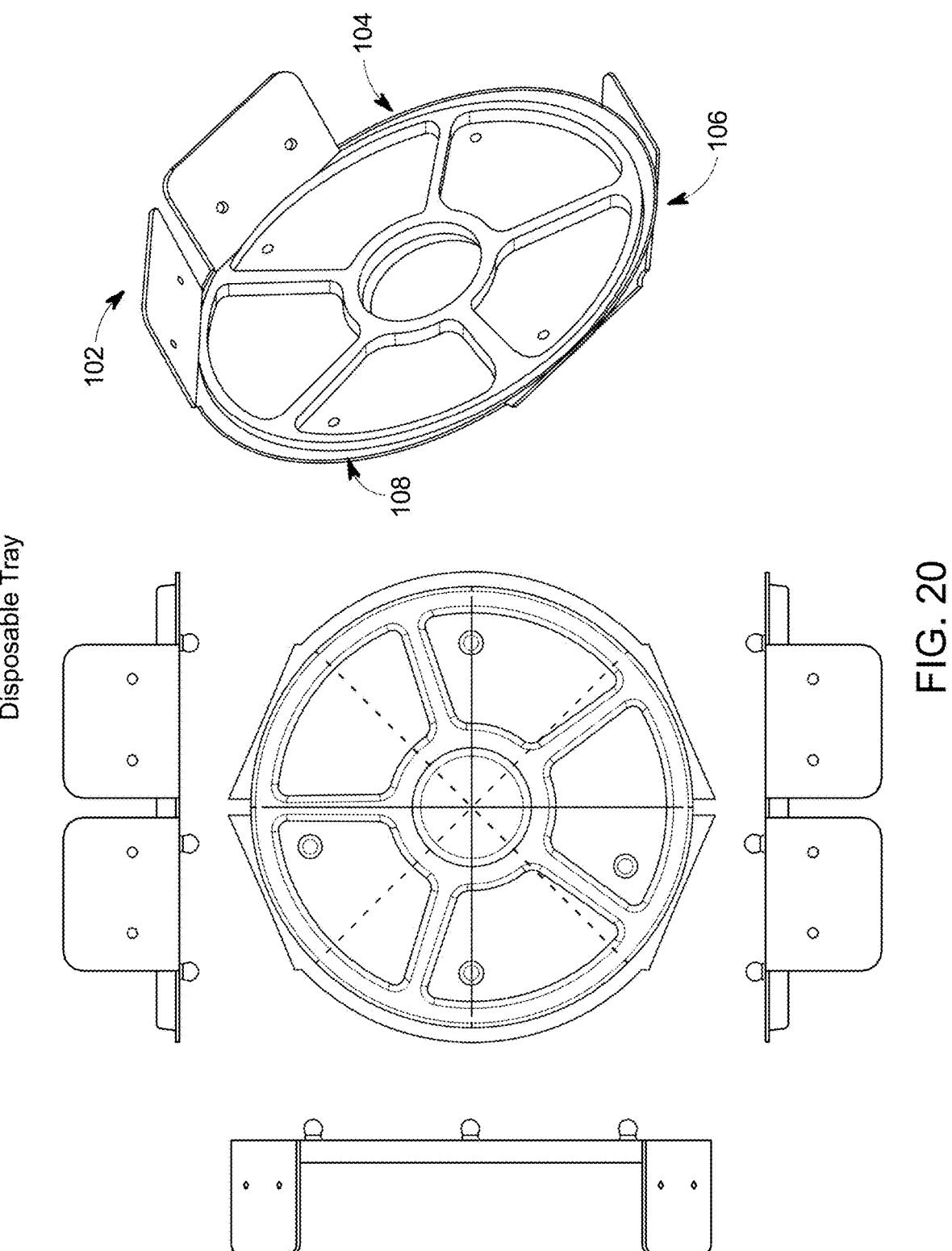

FIG. 20 shows a top view of the tray.

Figure 21:
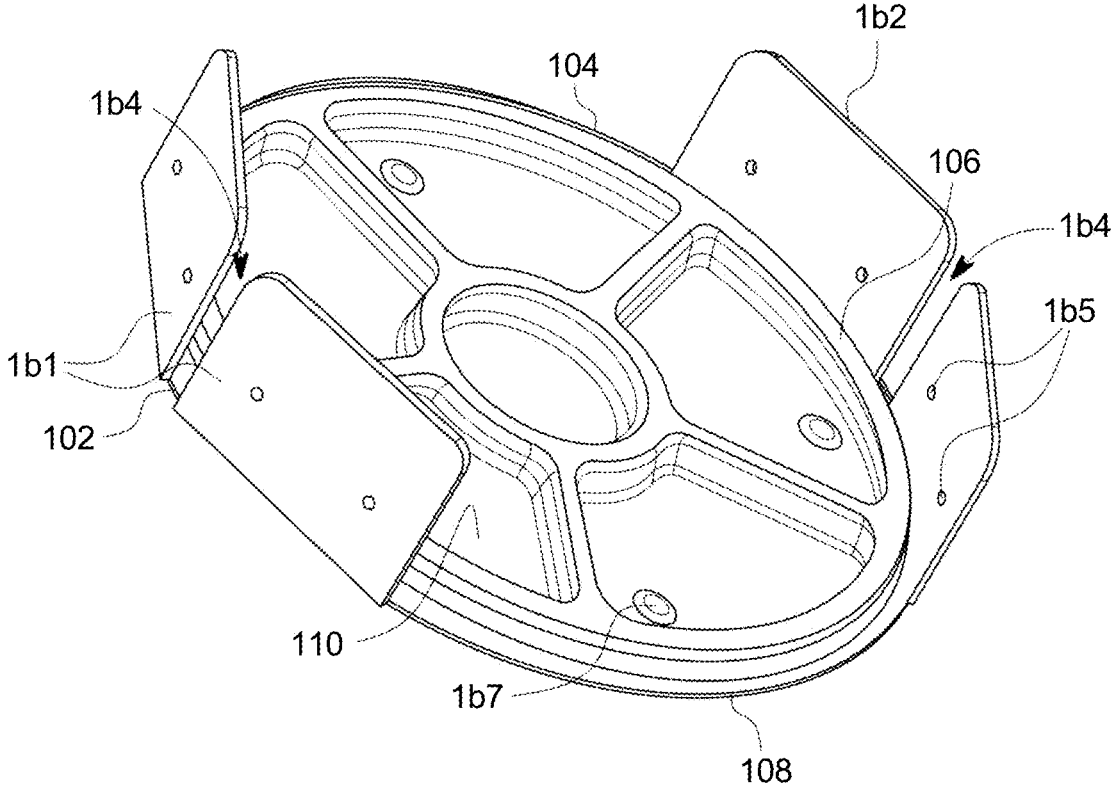
Figure 21:
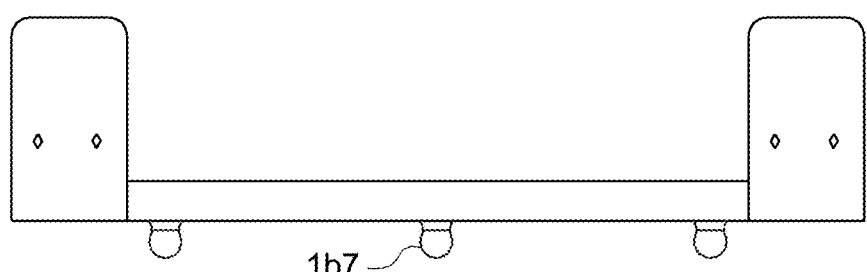

FIG. 21 shows a perspective view, including an elevation of the disposable tray.

Figure 22:
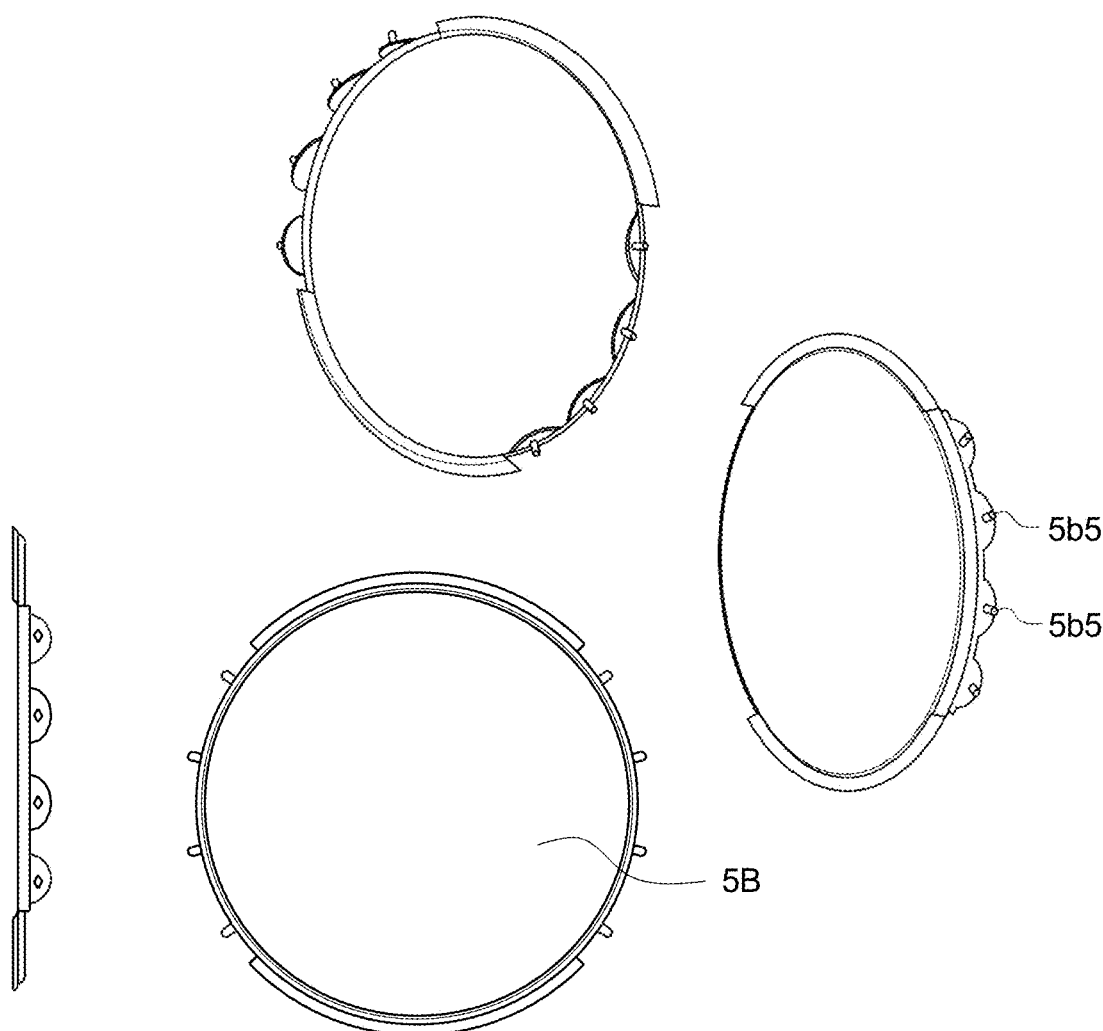

FIG. 22 shows different views of the plate.

Figure 23:
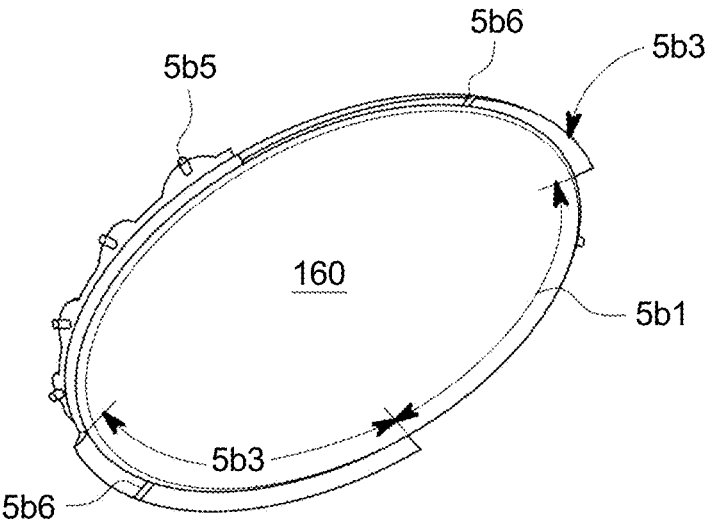
Figure 23:
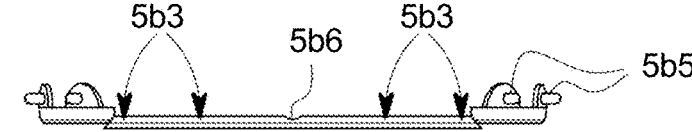
Figure 23:
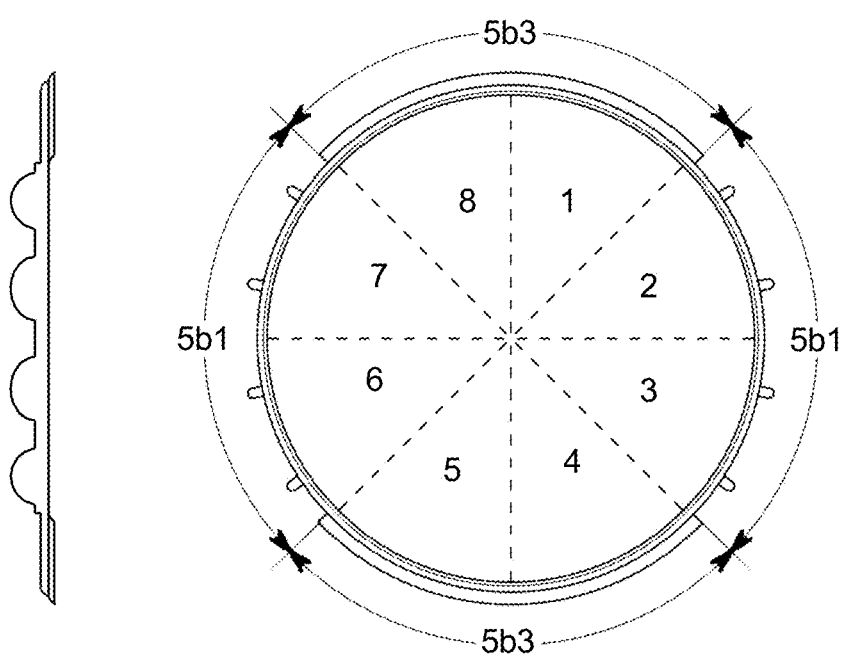

FIG. 23 shows a bottom perspective view and a top view of the plate.

Figure 24:
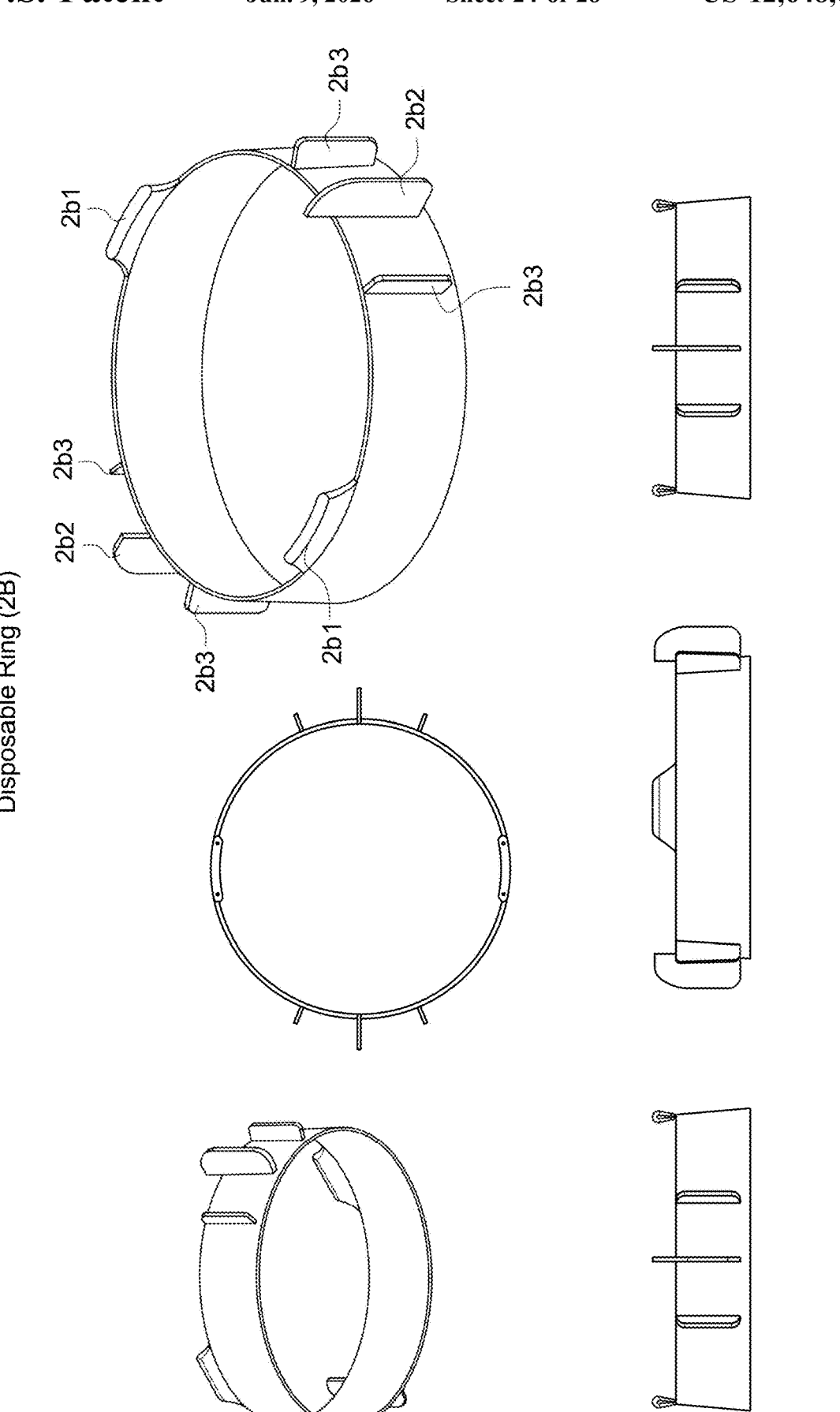

FIG. 24 shows different perspectives of the ring.

Figure 25:
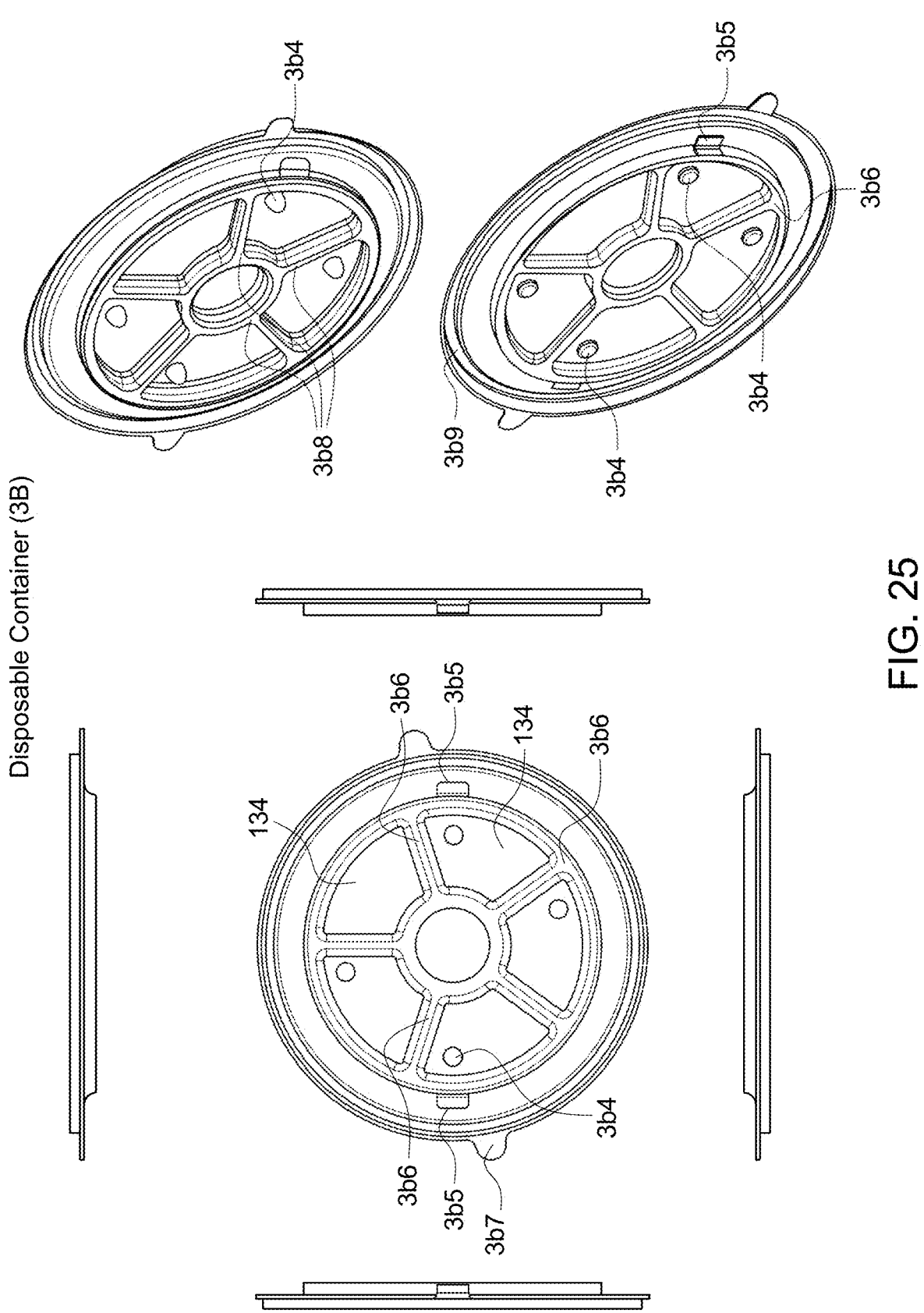

FIG. 25 shows top and bottom views of the container.

Figure 26:
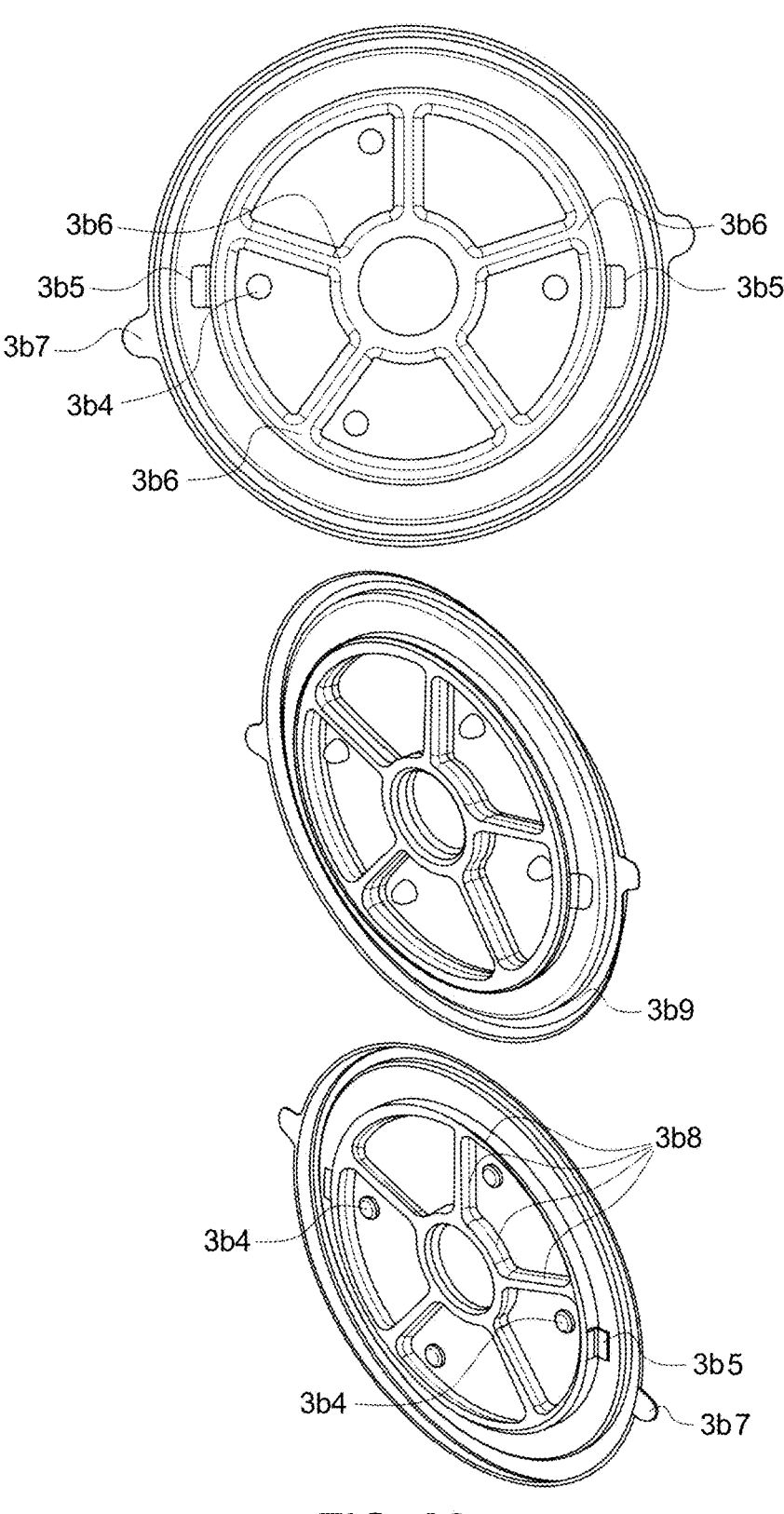

FIG. 26 codifies, shows a top view, and bottom and top perspective views of the container.

Figure 27:
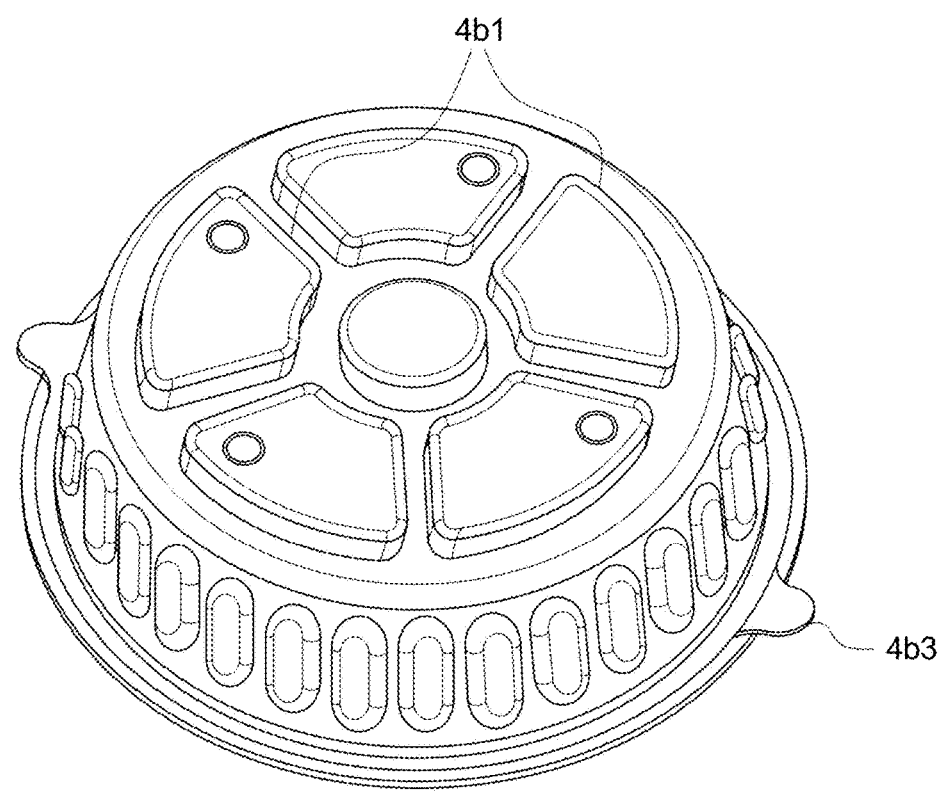
Figure 27:
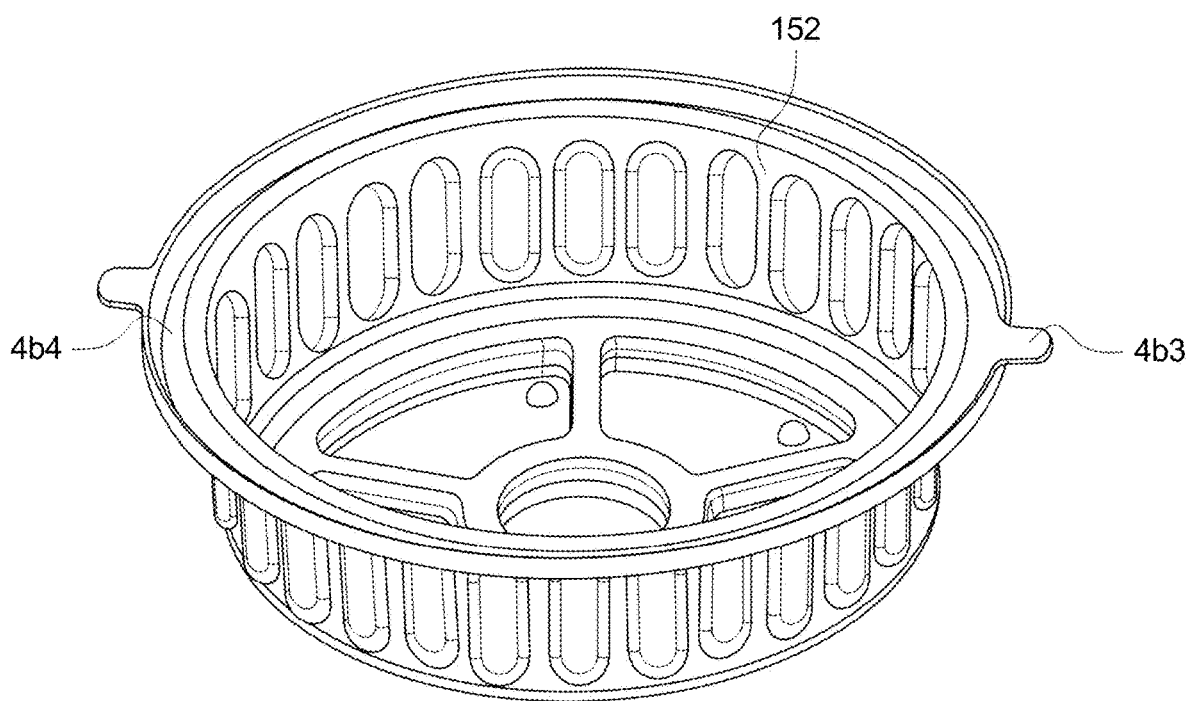

FIG. 27 shows a exterior and interior perspective views of the lid.

Figure 28:
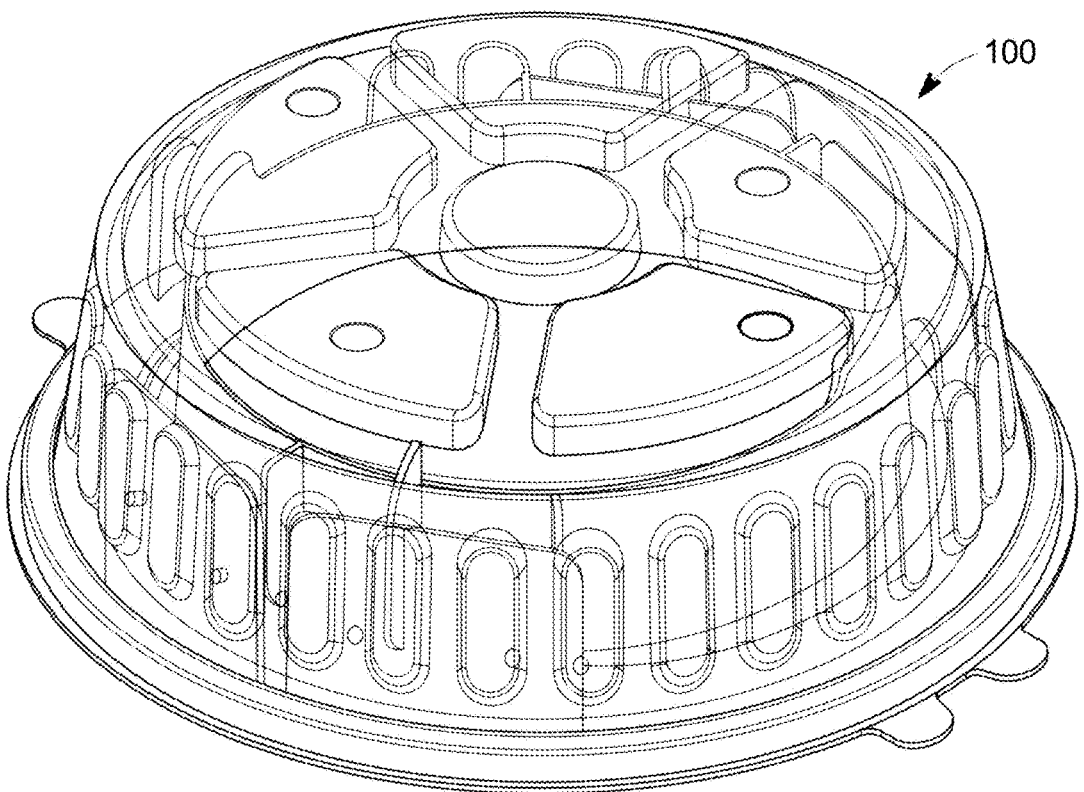
Figure 28:
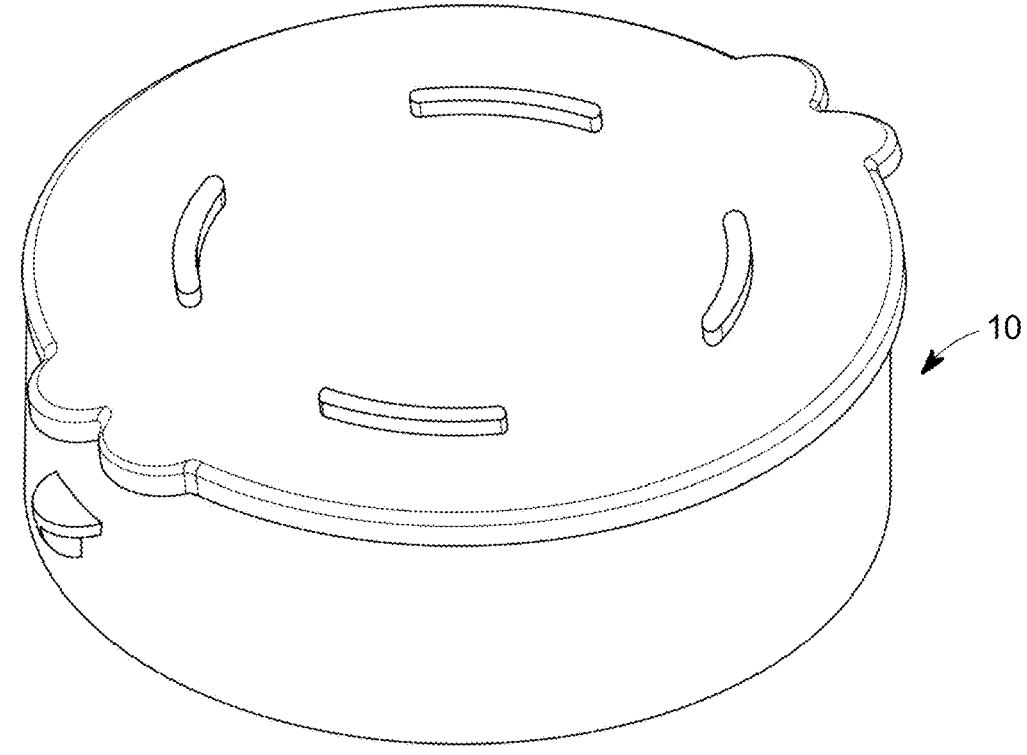

FIG. 28 shows perspective views of the disposable and non-disposable version of the container, respectively.

DETAILED DESCRIPTION OF THE PREFERRED EMBODIMENTS

Figure 1:
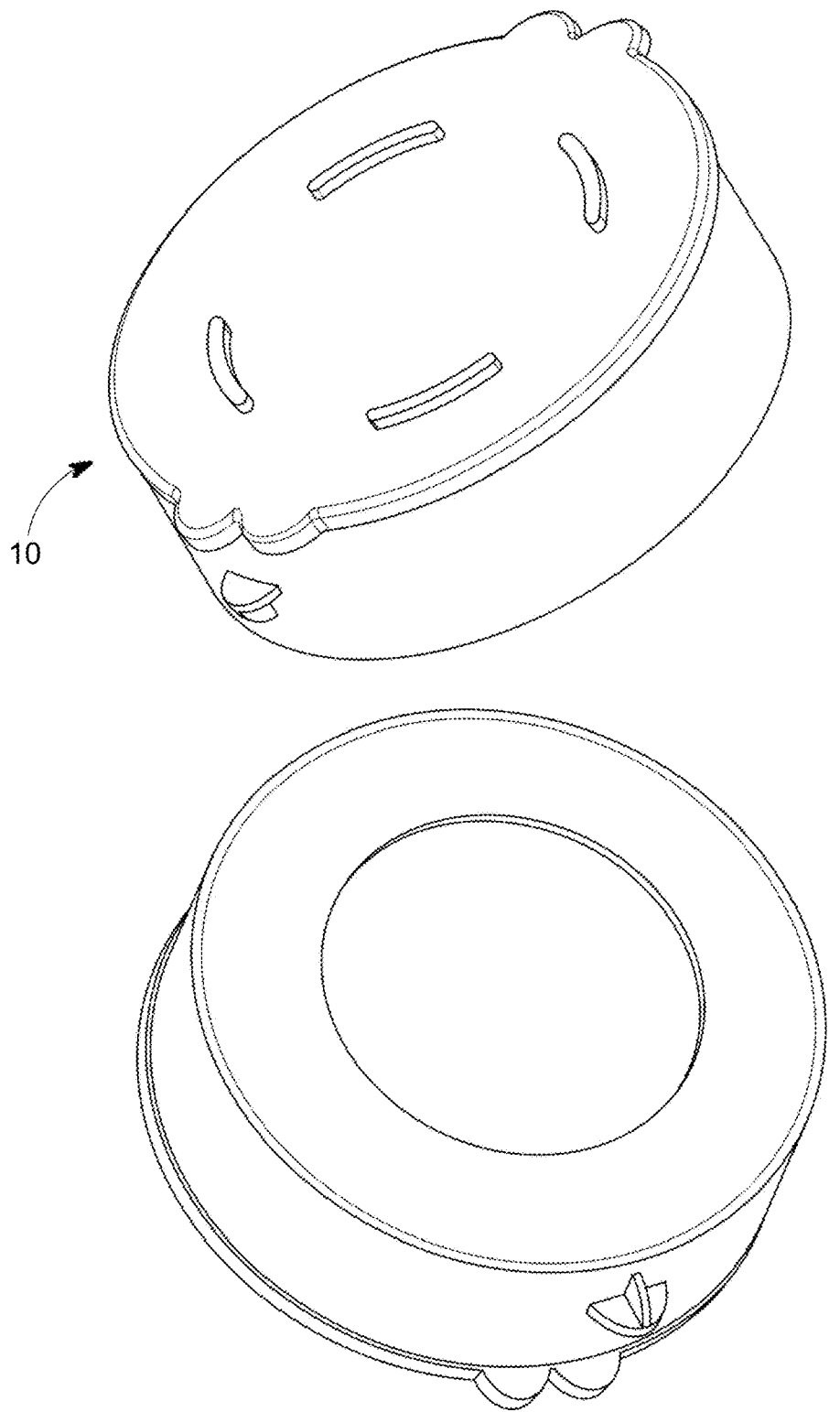
FIG. 1 shows a perspective view of a first embodiment of the apparatus of the invention fully assembled.
Figure 2:
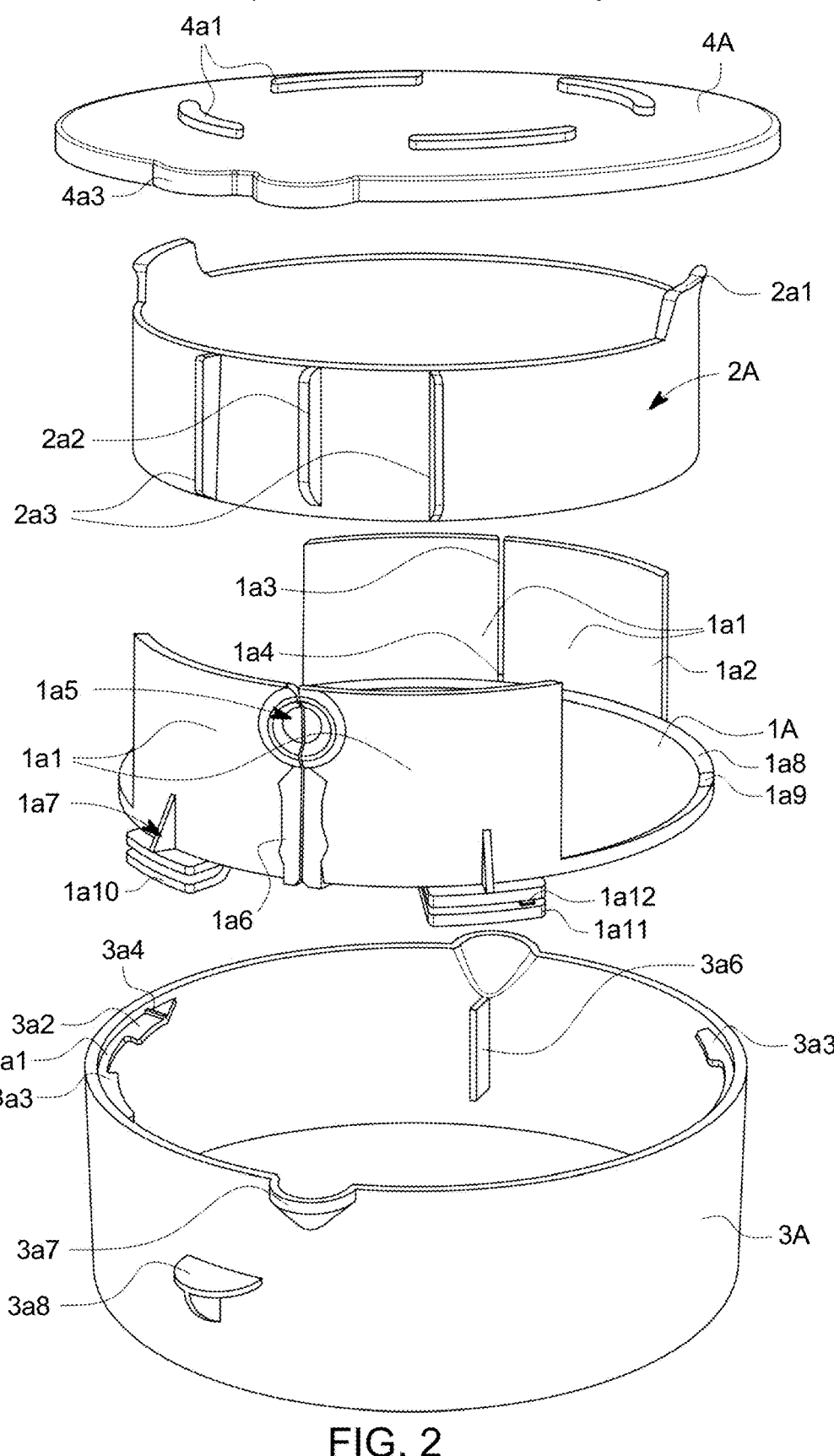
FIG. 2 shows an exploded view of the four components of the first embodiment.
Figure 3:
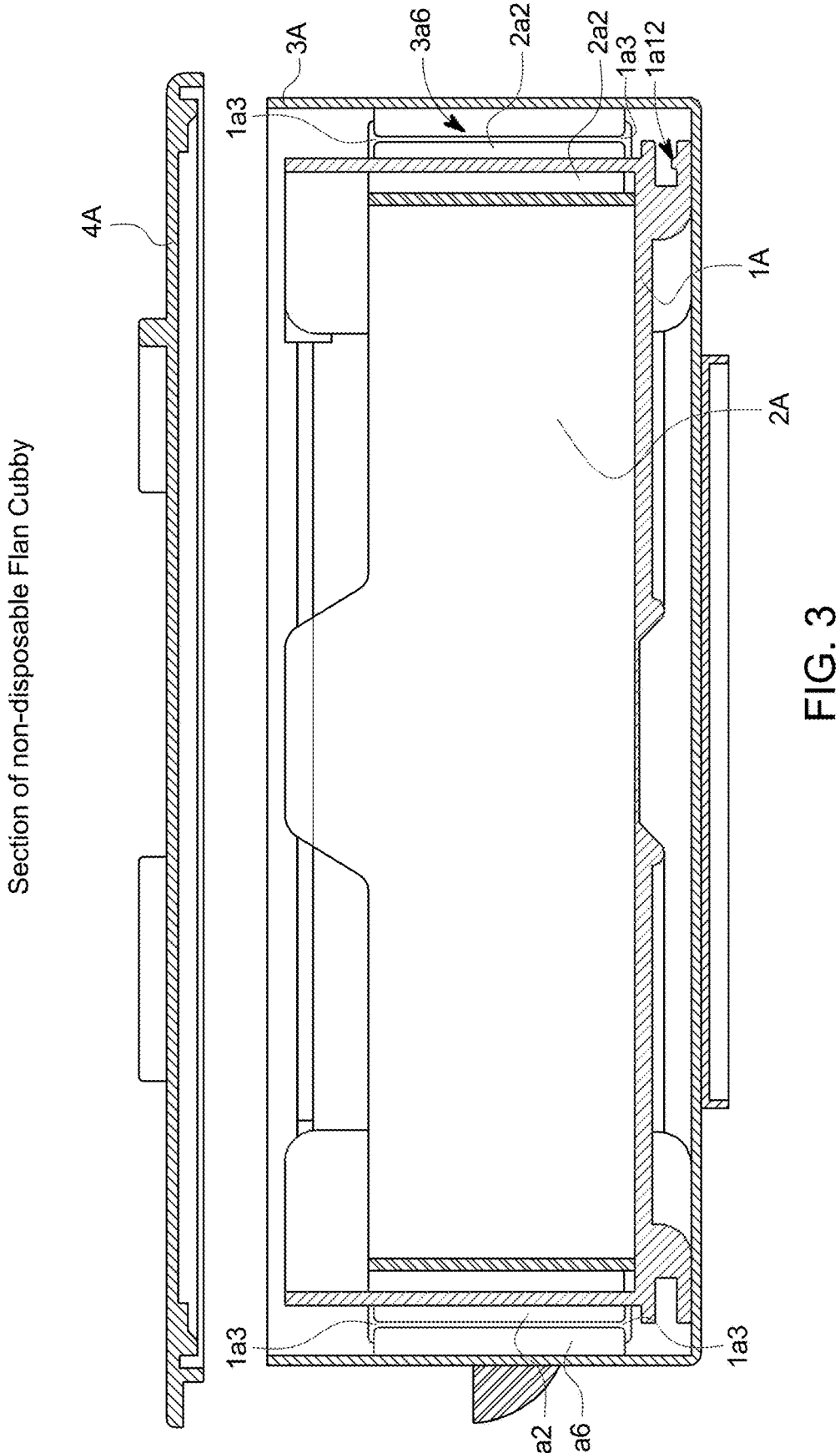
FIG. 3 is a cross-section detailing features of the first embodiment.
Figure 4:
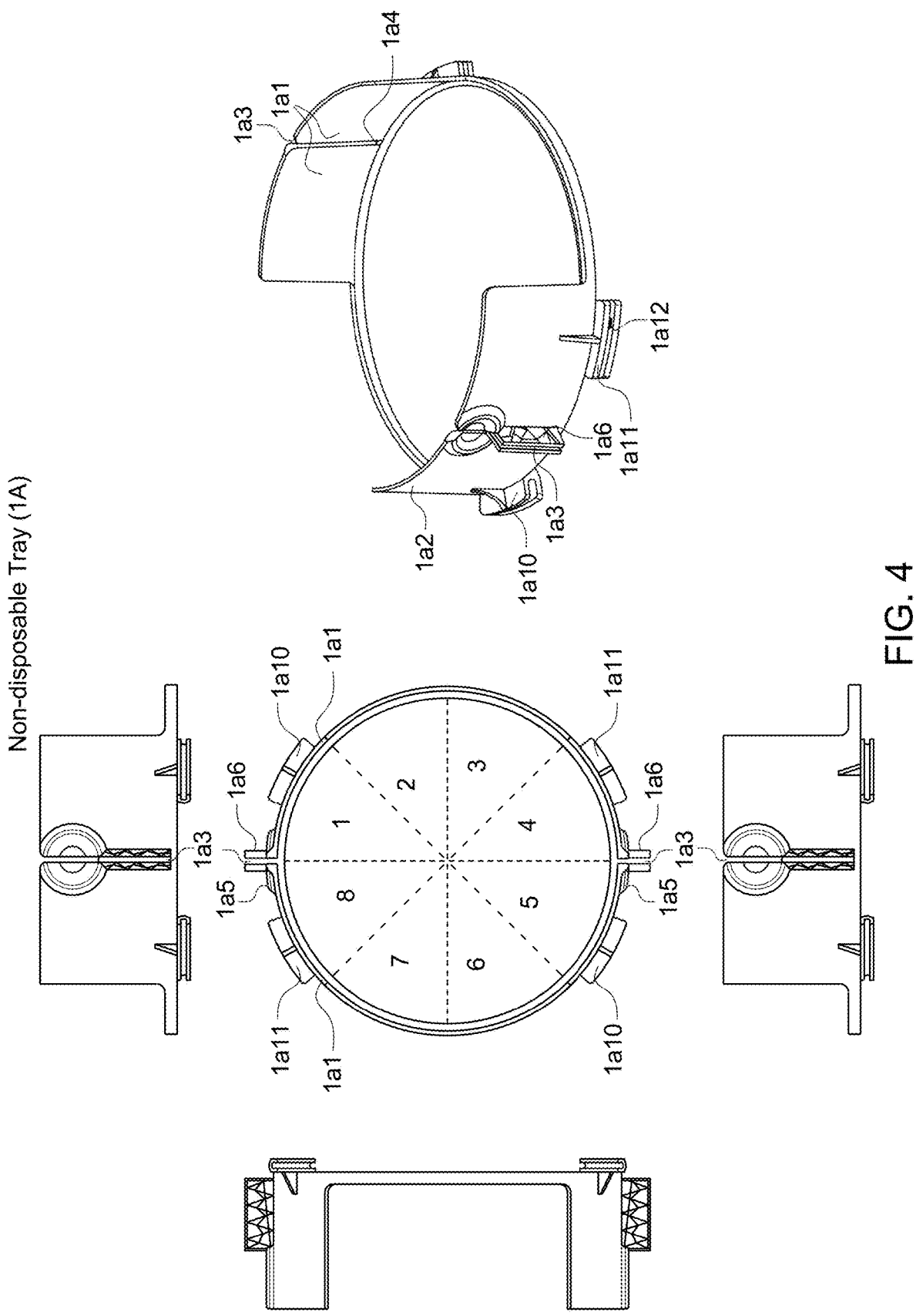
FIG. 4 shows a top view of the tray of the first embodiment, partly in section.

The purpose of the present inventive apparatus is to allow a user to more easily demold, slice, serve, a flans desert product. The resulting flans desert product is of commercial quality and can be stored in refrigeration and transported without loss of quality or appearance. As is known, the flans desert product is a custard served with a topping of caramel syrup, typically served in a shallow pool of caramel syrup. Flans desert products are difficult to prepare and preserve because of the difficulty in physically stabilizing the product, which is unstable due to the gelatinous nature of the product, as well as the liquid (syrup) portion of the product. The instability causes problems with slicing as straight cuts are difficult when the product is moving, and also with storage and transport as the custard portion of the product will move about within the pool of caramel, the caramel then staining or discoloring the product so that it is no longer of commercial quality. Another difficulty with flans product is that an excess of caramel syrup is generated as a byproduct of the process of preparation, if the custard product remains in the syrup it will discolor and degrade. Thus, it is desirable to provide an apparatus that can separate and stabilize the custard portion of the flans desert product. The inventive apparatus includes a unique tray that can be attached to a container. Referring now particularly to FIGS. 2 and 18, exploded drawings of embodiments of the non disposable (10) and disposable (100), respectively, are shown. It should be noted that the flan desert product is first baked in a mold which shapes and contains the custard portion of the desert product. The inventive apparatus allows the user to remove the flan product from the mold, separate most of the liquid from the flan product, and stabilize the flan product, while keeping all but a small portion of the liquid on a tray, with the remainder stored in an essentially leak proof container that keeps the excess liquid from flowing over the solid portion of the desert product. In operation for both embodiments; with one hand, the user supports and holds the bottom of the mold containing the flan; with the other hand the user places the tray (lA/lB) attached to the container (3A/3B) upside down on top of the mold. Once the guide-walls (lal/lbl) are aligned with the rim of the mold, the user lowers the tray. When the tray's floor has reached the rim of the mold, the user flips it over. The flan slowly lowers or "drops" onto the tray, and when the mold is removed most of the syrup spills into the container. A small amount of the caramel syrup is retained on the non-disposable tray or on the disposable plate to maintain its moisture, and avoid it adhering to the bottom of the custard portion. Once the flan rests on the tray, due to the tray's stabilizing configuration, it can easily be sliced and served. The tray can be removed from the container, set aside on a plate, and the excess caramel syrup collected in the container poured on top of each served slice. If the flan is not to be immediately consumed, the ring (2A/2B) is placed around it. The non-disposable tray lA is lowered and secured inside, and the disposable tray lB is secured to the container, with snap-on pins; it is covered with its lid (4A/4B) and placed in a fridge.

In both embodiments the trays lA, lB, have a disc shape where the flan sits and is held in place (stabilized) by the ring. The ring design allows the user to cut the flans into eight pie-shaped, same-sized slices. The trays lA, lB are divided into two pairs of "quadrants", creating four triangular or pie-shaped slices. Two opposite quadrants are slightly shorter than the other pair of quadrants which are equal in size. A couple of perpendicular guide-walls rise around (non-disposable embodiment 10) or behind (disposable embodiment 100) the arcs of the two smaller "quadrants". This difference in size between quadrants compensates for the varying thicknesses of the knives used to slice the flan. The guide-walls of both embodiments (disposable and non-disposable) of the tray lA, lB have a vertical gap at their center that runs from top to near bottom in the non-disposable version, and to the bottom in the disposable version.

In the non-disposable embodiment 10 the guide-wall's gaps have two exterior vertical flanges that run parallel to them creating a passage that allows:

a) to secure the ring to the tray keeping the product in place;

b) to secure the tray to the container;

c) to slice the product in two exact parts.

In the disposable version 100 the gaps between the guide-walls only allow a) and c) listed above, and the tray is secured to the container with a couple of snap-on fixtures, as will be explained in more detail later.

In both embodiments of the invention 10, 100 the apparatus performs the functions of stabilizing the flan product to facilitate precise cutting and transportation of the flans product. It can be appreciated that there are many desert products having a gelatinous portion (e.g., fruit jellies with cake portions) which can benefit from the inventive apparatus with little to no modifications.

In the disposable embodiment 100 the tray lA (as mentioned before) also has a plate. This plate attaches to the tray's lA walls with snap-on pins and configures the floor where the product will rest; it also holds the guide-walls in place. In the non-disposable embodiment 10, the tray is also the floor, or the lowermost surface upon which product can rest.

Both disposable and non-disposable embodiments of the tray lA, lB, have two opposite spill sections. The non-disposable version has a rim around the spill section that retains part of the caramel syrup, and in the disposable version the plate's rim performs this task. This small amount of caramel maintains the product's moisture, avoids it adhering to the floor, and extends its shelf life.

The non-disposable embodiment 10 of this appliance attaches the tray lA to the container using a set of horizontal grooves at the bottom of the tray, horizontal flanges inside the container, an end-stop fixture, and a lock mechanism. These features allow the user to mount, rotate and lock the tray lA to the container, and reverse the process in order to effect serving the product. The disposable embodiment uses snap-ons to attach the tray lB onto the container. In both versions, there is a millimetric gap between the tray's outer circumference, and the container's interior circumference. This gap allows excess of caramel or other liquids to spill into the bottom of the container. Liquid can be recovered by detaching the tray from the container, setting it aside, and pouring it out of the container through drainage openings designed for that purpose.

The ring surrounds the flan or other custard or cake products and keeps them in place on the tray lA, lB. It is a short open ended cylinder conforms to the shape of the product. It has six vertical exterior flanges. The two primary central flanges fill the gap (left by the mold when removed) and insert in the gaps between the tray's guide-walls, keeping the product from wobbling inside the tray. The other four short flanges aid the central flanges in keeping the ring's content in place.

The container in both embodiments is where the tray rests, and serves as the caramel syrup reservoir. The container's non-disposable version has a couple of interior, vertical, opposite flanges that allow it to raise or lower the tray, and keep it in place while stored or transported. The disposable container attaches to its tray with a couple pairs of snap-on fixtures. The non-disposable container has a couple of opposite horizontal flanges in its interior, and two unobstructed spaces between them. This pair of horizontal flanges serve to mount the tray on them, rotate it, lock it to the container, and reverse the process. The unobstructed spaces serve to freely lower and raise the tray inside the container. In both versions the upper pattern of the lid matches with the bottom pattern of the container, allowing for nestable storage. The plate only concerns the disposable embodiment 100, and has the same function as the non-disposable tray's IA floor.

Figure 5:
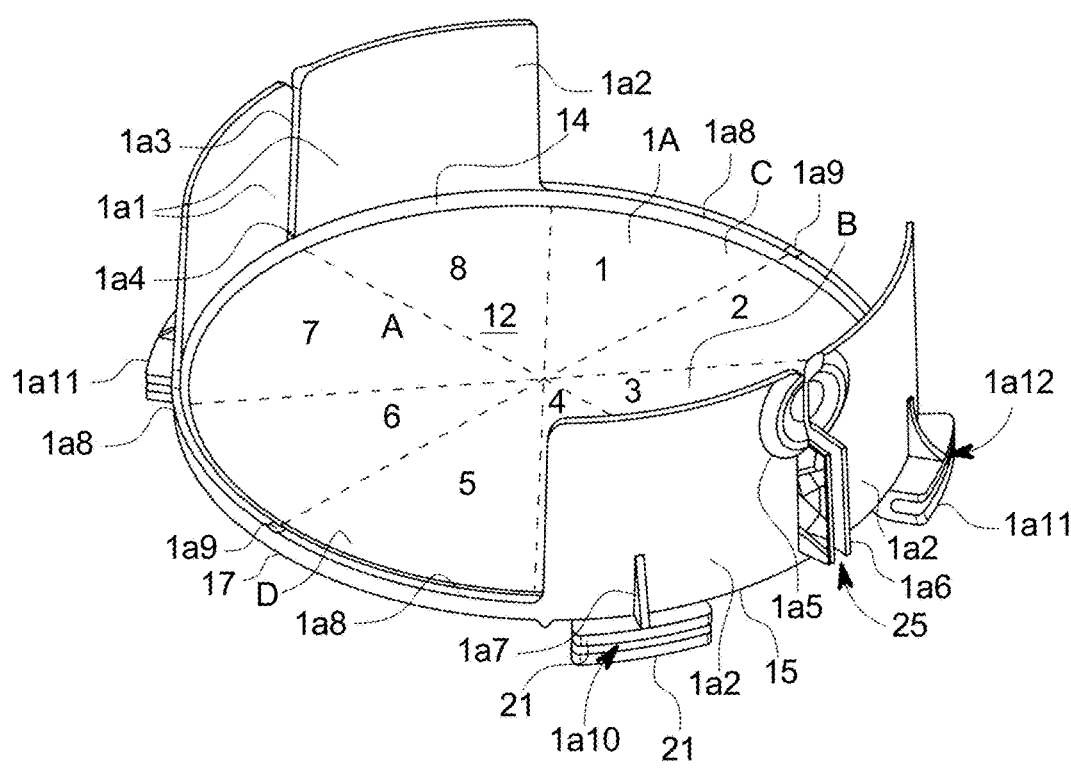
FIG. 5 shows two different perspectives of the tray.
Figure 5:
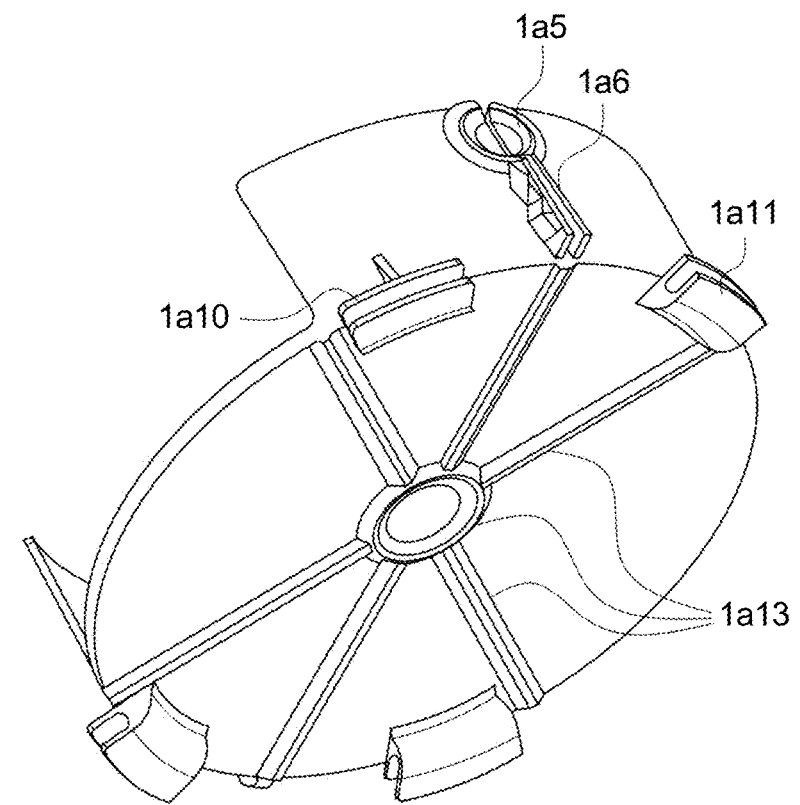

Referring now to FIGS. 1-16, the components of the non disposable embodiment IO are shown in detail. The measurements given are for proportion only, larger or smaller apparatuses IO may be made, provided the relative sizes are maintained as would be apparent to one of skill in the art. The non-disposable tray IA is a 19.6 cm diameter (61.5752 cm circumference) disk that, as mentioned before, is divided into four quadrants A, B, C, D as can be seen particularly in FIG. 5. Two opposite quadrants A and Bare 15.1938 cm (88.83 degrees) and are 4 mm shorter than the other adjacent 15.5938 cm (91.17 degrees) quadrants C and D. This difference in size is meant to compensate for the thickness of the knife used to cut the flan in equal slices. A guide-wall (lal) (6 cm tall, 0.2 cm thick) on quadrant A rises perpendicularly behind the floor level around the quadrant's arc 14. At the center of each wall lal there is a 0.3 cm gap (la3) that runs from the top to 0.5 cm above the tray's floor 12, and divides each guide wall lal in two sections (la2). This 0.5 cm height will form a short rim (la4) that impedes the flow of caramel to prevent spillage over the wall's gap la3. The two opposite guide-walls (lal) allow a standard 6×19 cm mold to slide between them, and reach the tray's floor 12.

Two (0.3 cm tall, 0.2 cm wide) rims rise along both 15.5938 cm arcs 15, 16 that configure the spill-sections (la8). Their purpose is to enclose the tray floor 12 to limit spillage and retain a small amount of caramel. This will maintain the flan custard portion moisture, and avoid it from sticking to the tray's floor 12. At the center of each spill area la8 there is an aligning dent mark la9. These marks la9 allow the user to slice flans custard in half; then, if the product is sliced from gap Ia3 of a guide-wall to the gap of the opposing guide-wall, that is in front it will have been cut in four equal parts; finally, if it's sliced from the sides of one guide-wall lal to the opposite side guide-wall lal the flans custard will be cut in eight exact slices as numbered in the FIG. 5.

Beneath each guide wall lal are a pair of grooves la IO, lal1. The interior horizontal flanges 3a2, 3a3 of the container 3A are meant to slide between these grooves lalO, lall. The grooves la IO, lal I allow the tray IA to rotate inside the container 3A. Each pair comprises a leading groove (lalO) and a locking groove (lall). Grooves lalO, lall are separated 6.99 cm from each other at their base; the two groove pairs lalO, lal I are separated 15.49 cm at their base. Each groove lalO, lall is formed by two flanges 21.

As mentioned above, the interior horizontal flanges 3a2, 3a3 of the container 3A are meant to slide between these grooves lalO, lal I; the grooves allow the tray IA to rotate inside the container 3A. At the point where the leading grooves (lalO) reach end-stop fixtures 3a4 on flange 3a3 the locking grooves (lall) secure the tray. This allows the user to turn the tray IA attached to the container 3A upside down, place it on top of the flan's mold, and flip it over. The flan custard will then slide down onto the tray IA, where it can be easily sliced or lowered into the container 3A. See FIG. 12.

Each guide-wall is composed of two sections (la2) divided by a passway (gap) (la3). Each of these sections la2 is reinforced on its exterior bottom center by a triangle shaped flange (la7). The bottom side of the tray 1A is also reinforced by a ring 23 at its center, and six bars extend from it (lal3). Two bars lal3 end below the gaps la3; the other four bars lal3 extend from the rings 23 exterior-border to the bottom edge of each wall lal.

The tray wall lal, la2 exterior have at their top center an ergonomic finger shaped ring la5 that aids the user when lifting and lowering the tray. It also has a thumb tab la6 with an interior channel 25 forming a vertical passway. The tab (la6) is useful to hold and rotate the tray IA.

The tray's bottom grooves lalO, lall engage with the container's horizontal flanges 3a2, 3a3 clockwise. The first grooves that reach the container's flanges are the leading grooves (la IO) the ones that follow are the locking grooves (lall).

There is a locking mechanism lal2 at the rear end of the locking grooves lall moving clockwise. This mechanism lal2 engages locking features 3a4, 3a5 on the upper face of the bottom flange 3a3. It is configured by a trapezoidal fixture (lal2) that runs along grooves beneath the container's locking flanges (3a3), and "locks" the tray in place. See FIGS. 5, 13 and 16.

Figure 6:
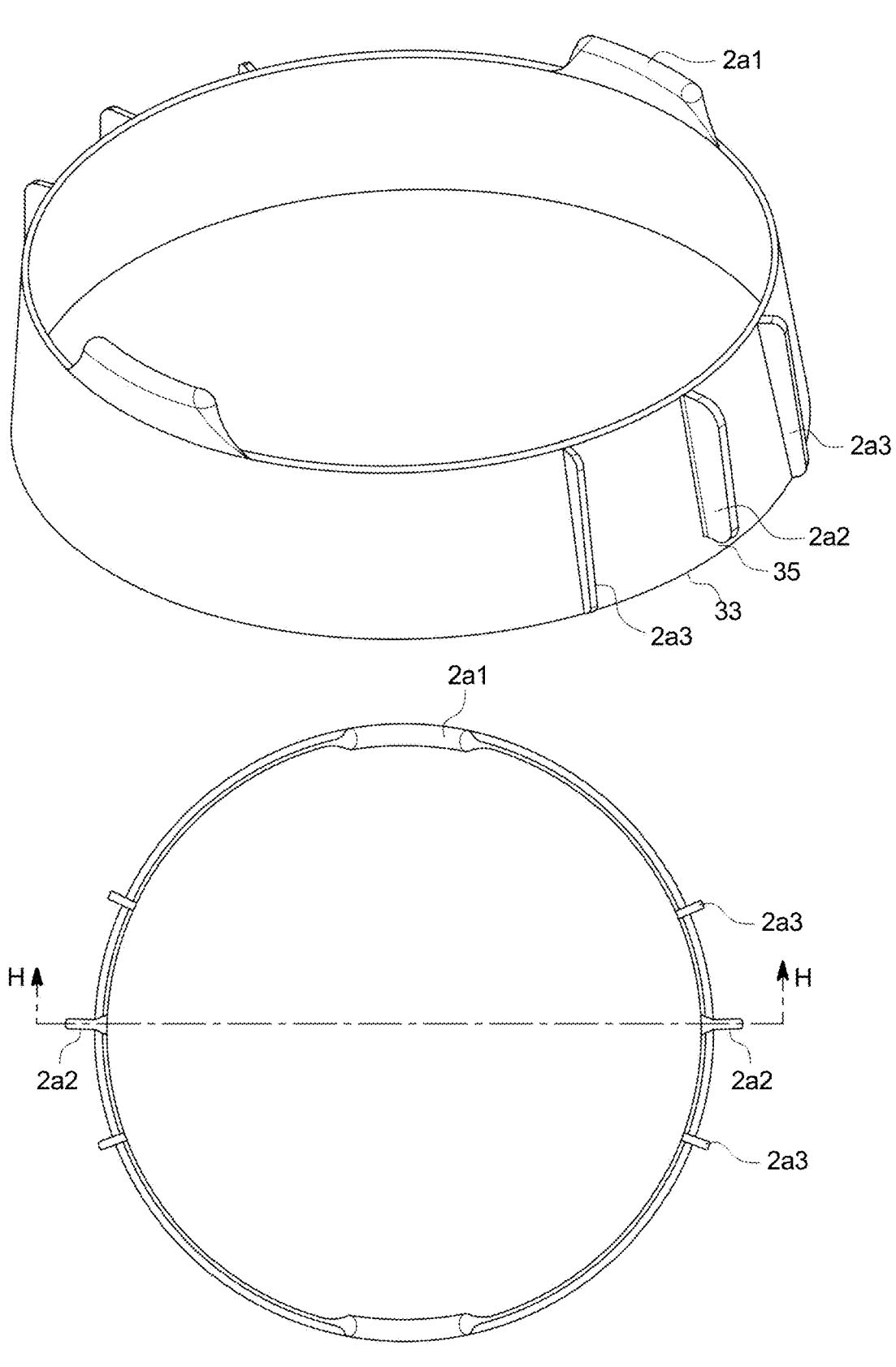
FIG. 6 shows a top perspective view of the ring of the first embodiment.
Figure 7:
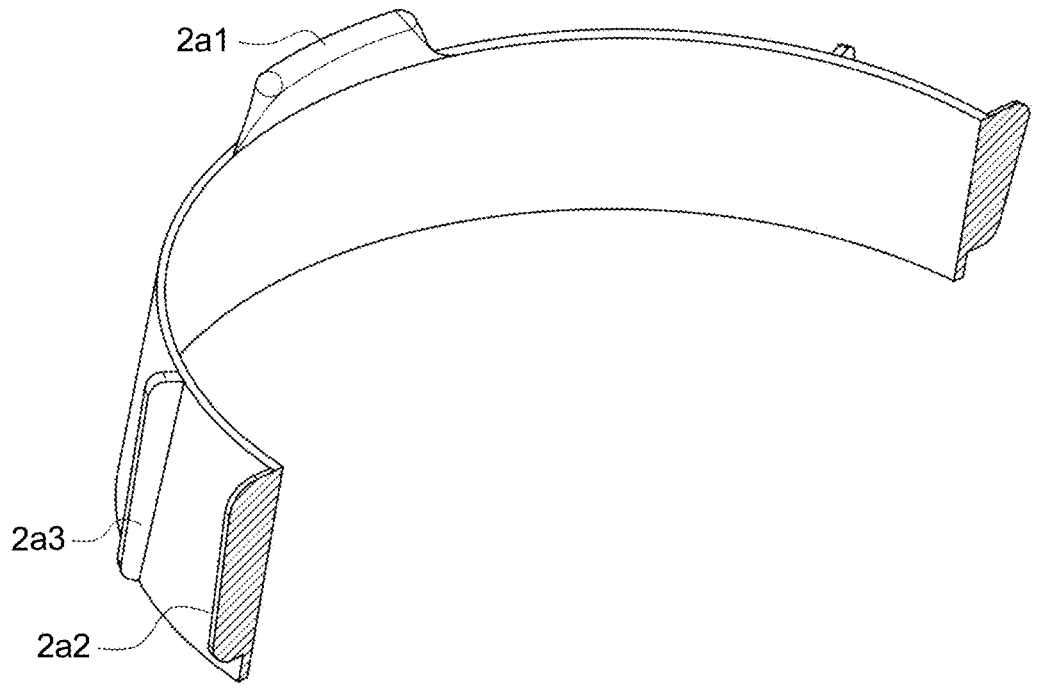
FIG. 7 shows two sectional views of the ring.
Figure 7:
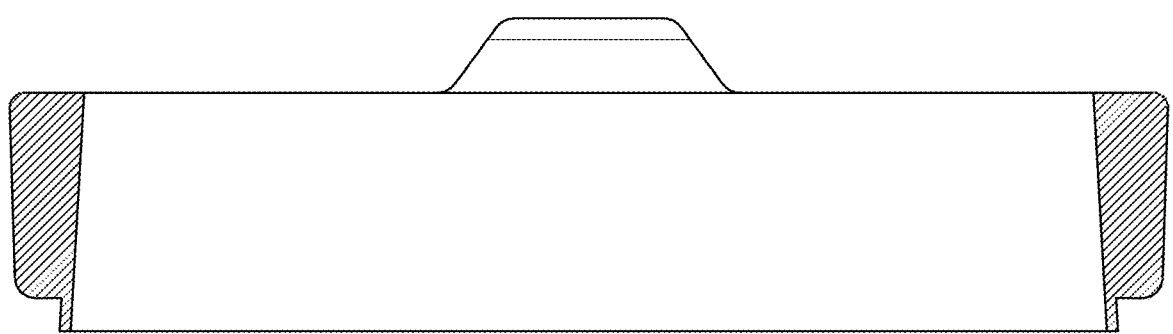

The ring 2A fills the void left when the flan mold is removed, and keeps the flan custard portion or other desert products in place when transported. The ring 2A is a restraining component that conforms to the solid portion of a desert product having both a solid (i.e., the custard portion of a flans desert product) and liquid part, the element functioning to stabilize the solid part of the desert. The ring 2A has a frusto-conical shape as can be seen in FIG. 6. Two opposite lifting handles 2a1 extend from the top border of the ring 2A on to facilitate raising and lowering. Its upper interior diameter is 17.6 cm and its bottom interior diameter is 18.1 cm. It also has six exterior vertical flanges 2a2, 2a3 that help keep the ring stationary relative to the container and tray IA. The main flanges 2a2 are vertically disposed and extend from opposing sides of the ring 2A, and are 4 cm long, 0.746 cm wide at the top, 0.846 cm wide at the bottom, and 0.25 cm thick) extending from the upper edge of the ring 2A to about 0.55 cm from the bottom edge 33 of the ring, leaving a small gap 35. The main flanges 2a2 are placed at 90 degrees from the center of the lifting handles 2a1, and inserted in the gap la3 between the tray's walls lal, la2, impeding wobbling or other movement of the custard portion of the product. See FIGS. 6, 14 and 15.

Each of the four auxiliary flanges (2a3) are placed 22.5 degrees aside of the main flanges 2a2. As a result, the auxiliary flanges 2a3 will align at the center of each section of the tray's guide-walls lal, la2. They are 0.2 cm thick, and run 5 cm from the top edge to the bottom edge 33 of the ring 2A. At the top the auxiliary flanges 2a3 are 0.378 cm wide, and 0.522 cm at the bottom. See FIG. 14.

Figure 8:
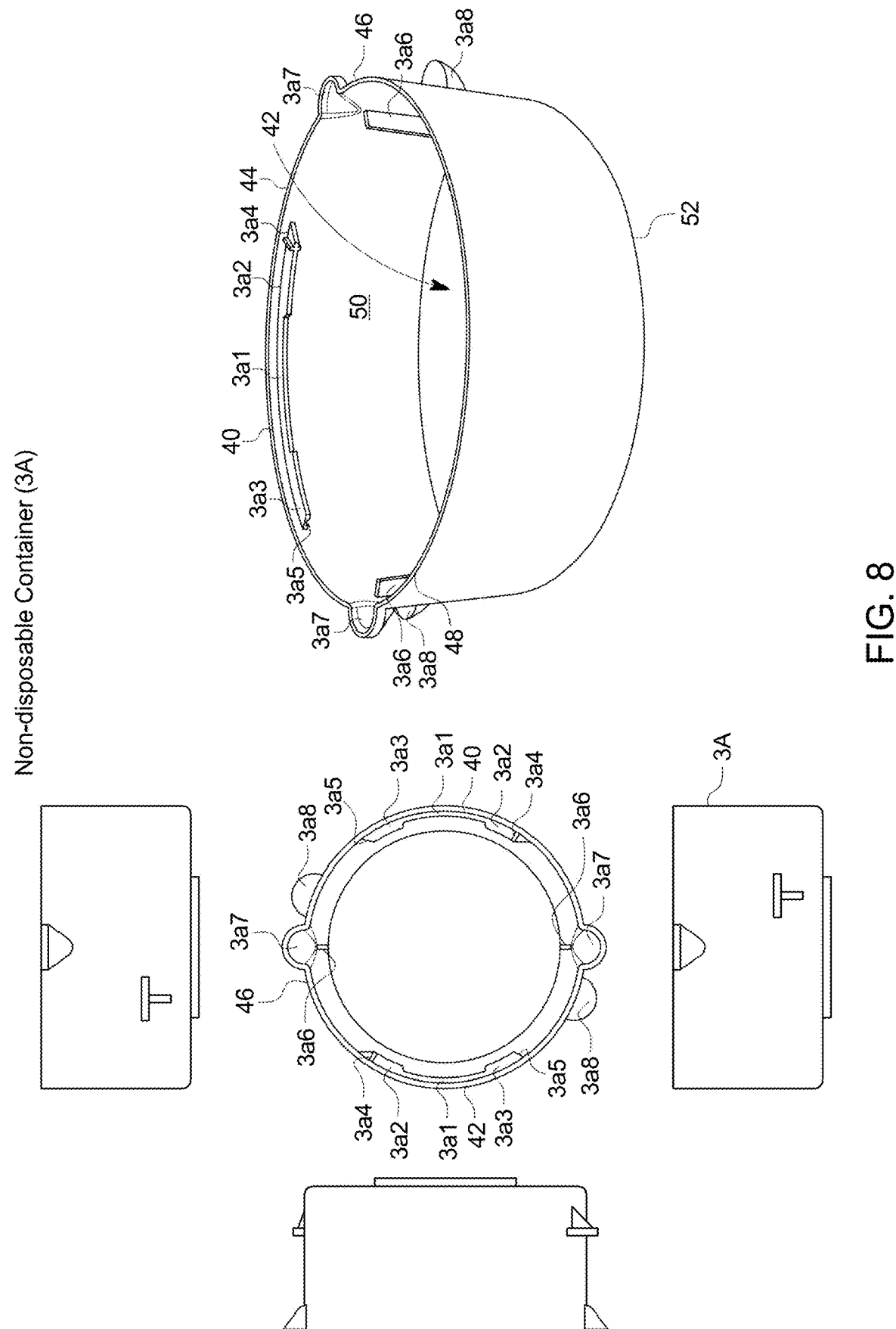
FIG. 8 shows a perspective view of the container, a top view, and three elevations.
Figure 9:
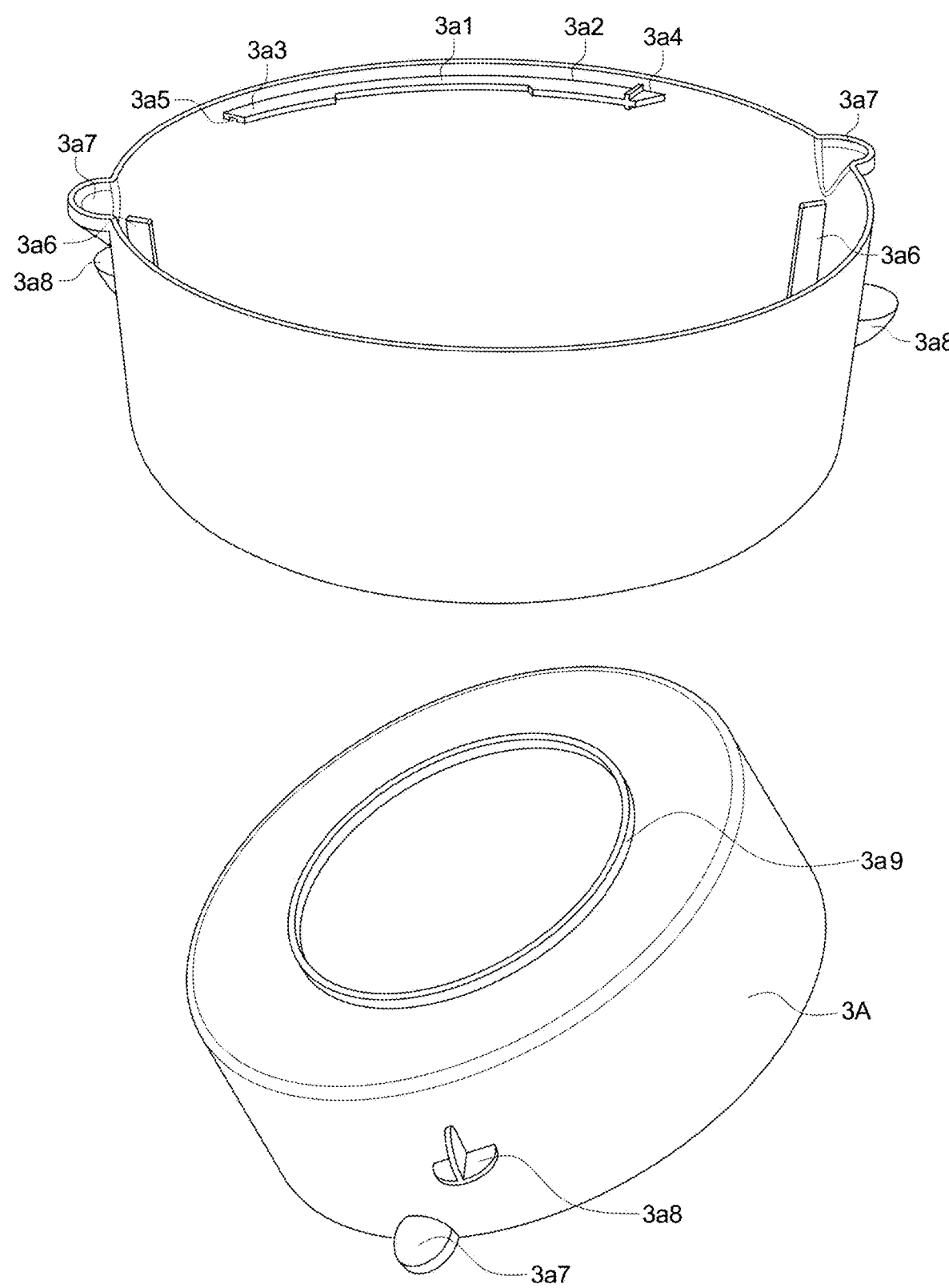
FIG. 9 shows two perspectives of the container.
Figure 10:
FIG. 10 shows two perspective views of the lid, three elevational views.
Figure 11:
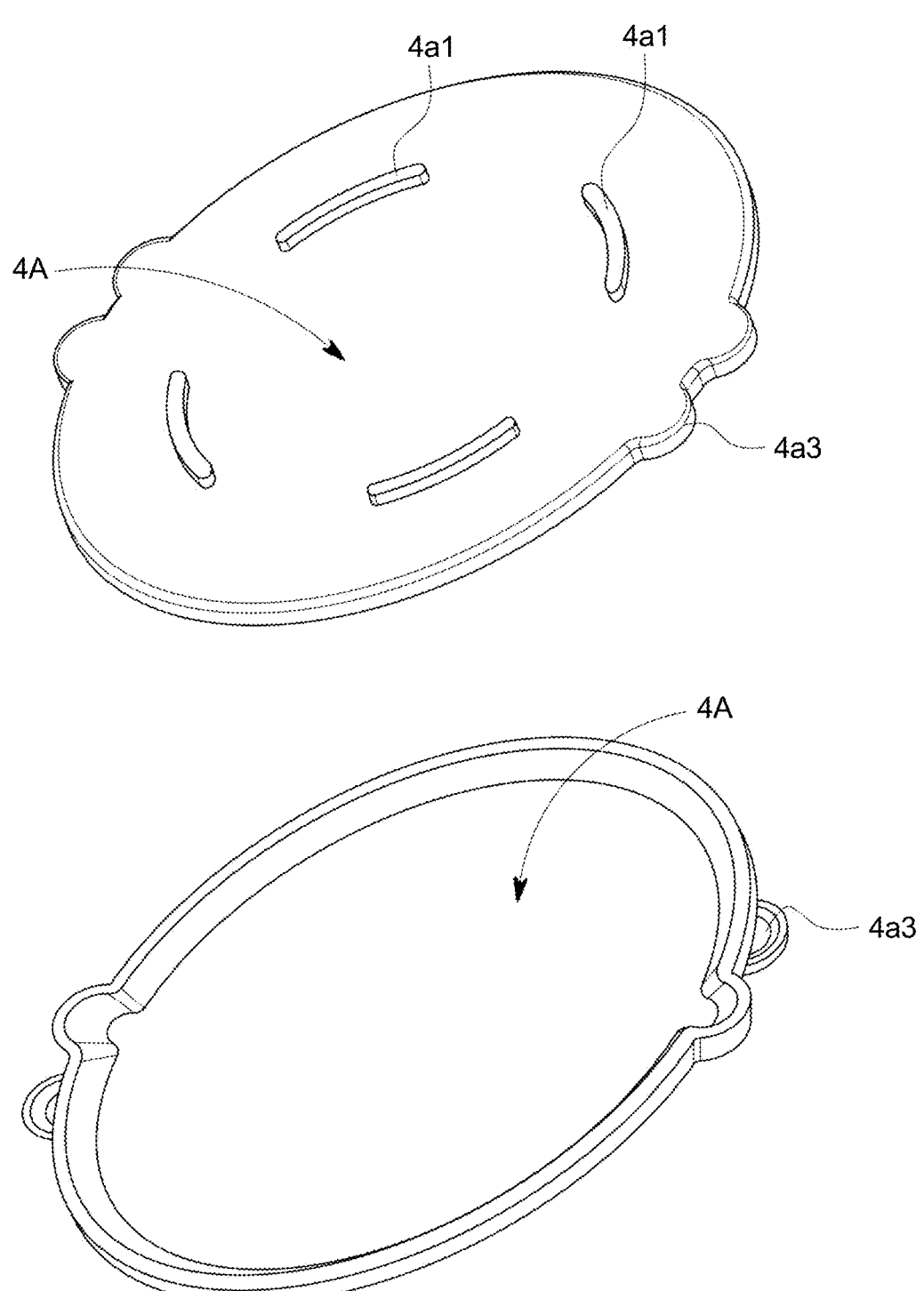
FIG. 11 shows a top and a bottom perspective of the lids.
Figure 12:
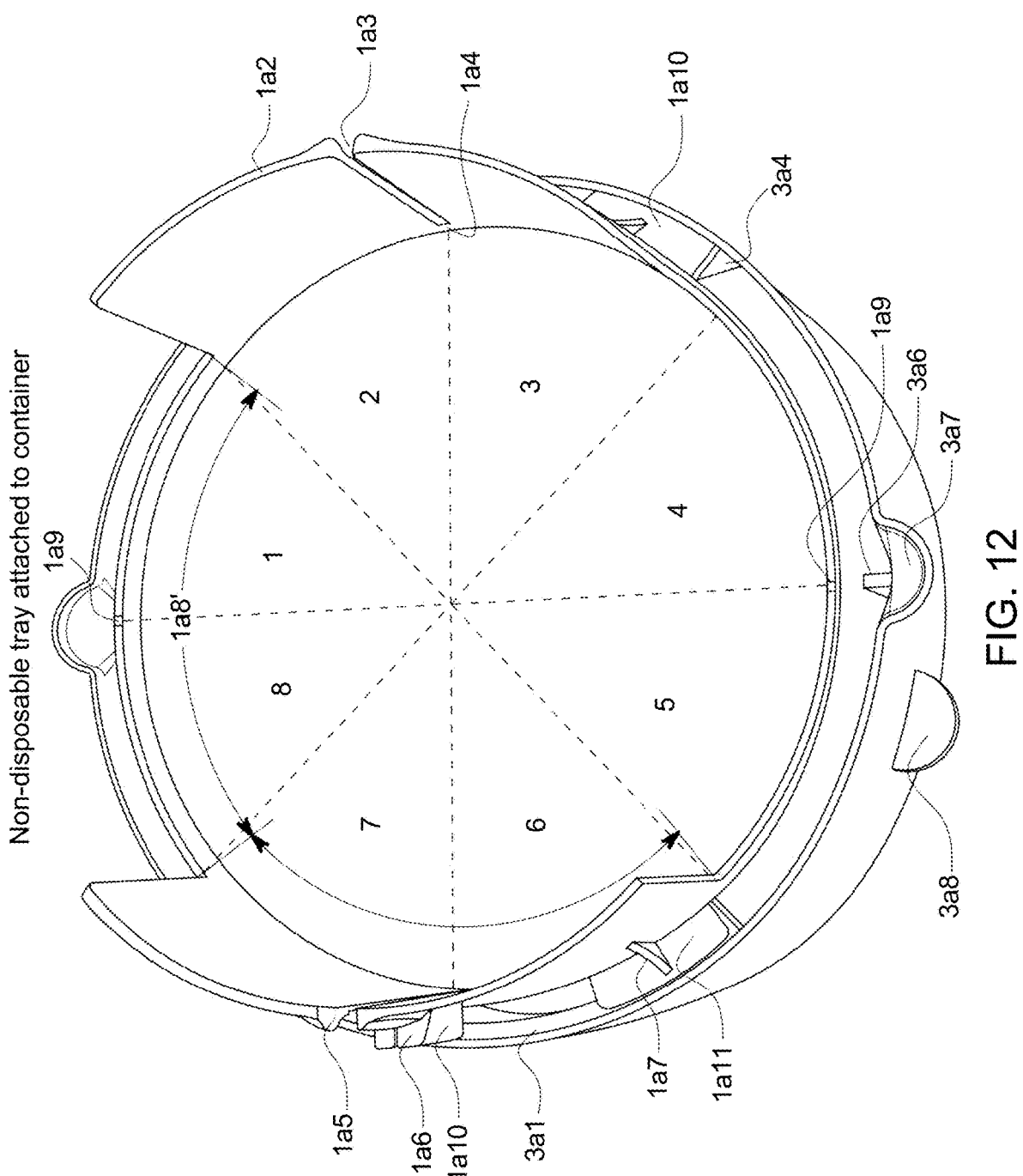
FIG. 12 shows a top view of the tray mounted and locked onto the container.
Figure 13:
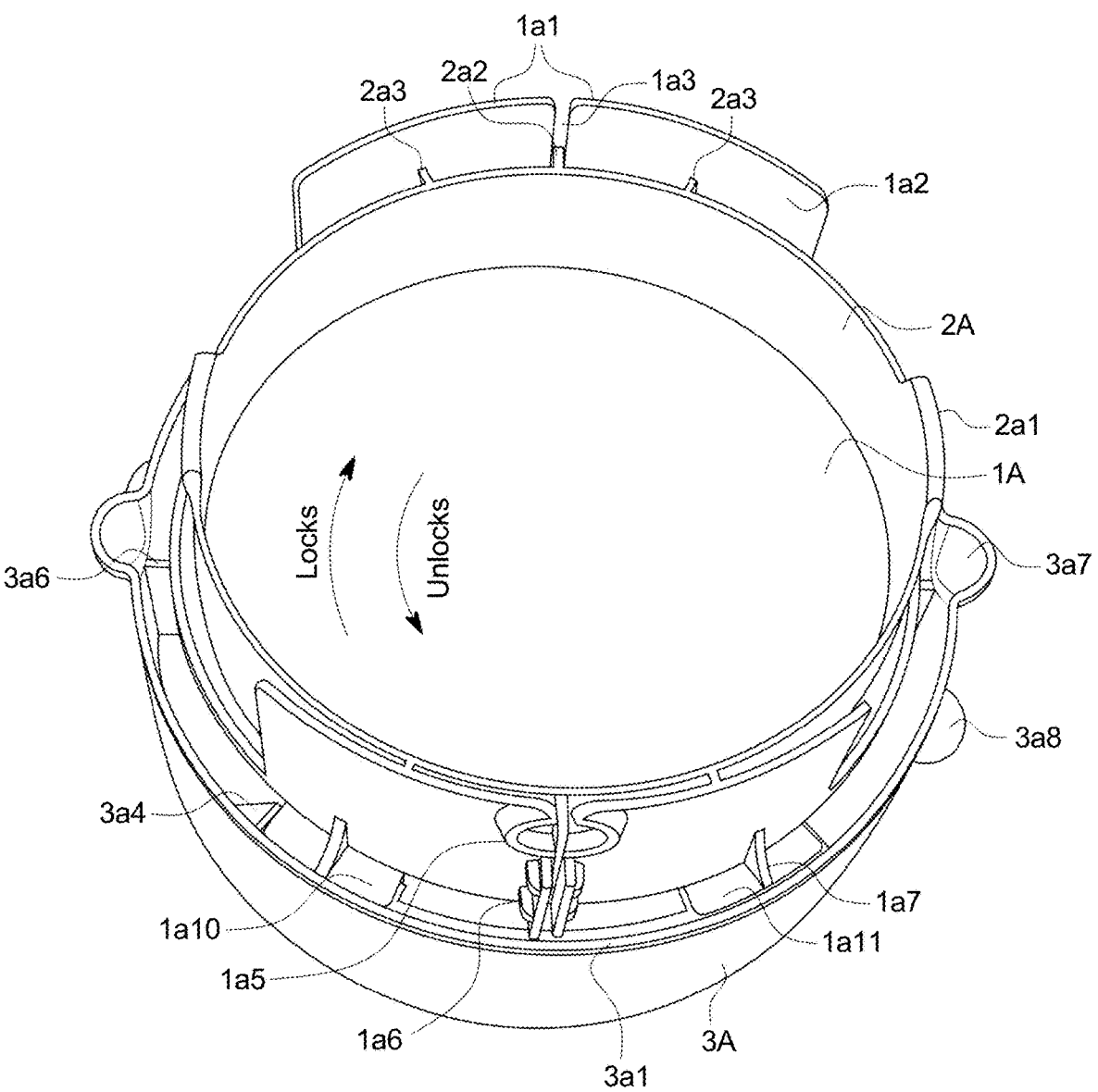
FIG. 13 shows a top view of the ring attached to the tray.
Figure 14:
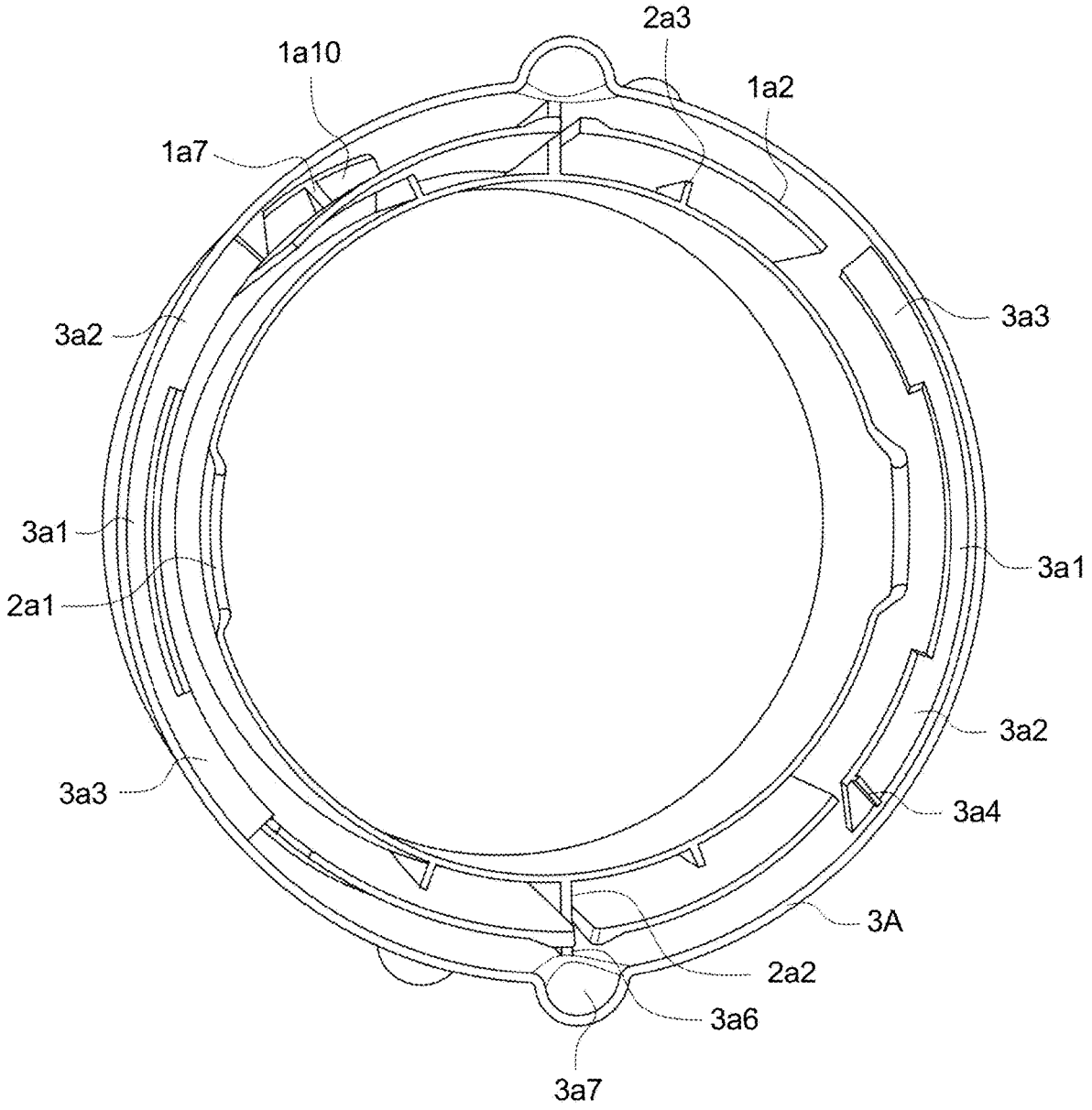
FIG. 14 shows a top view of the ring secured inside the tray with the tray attached inside of the container.
Figure 15:
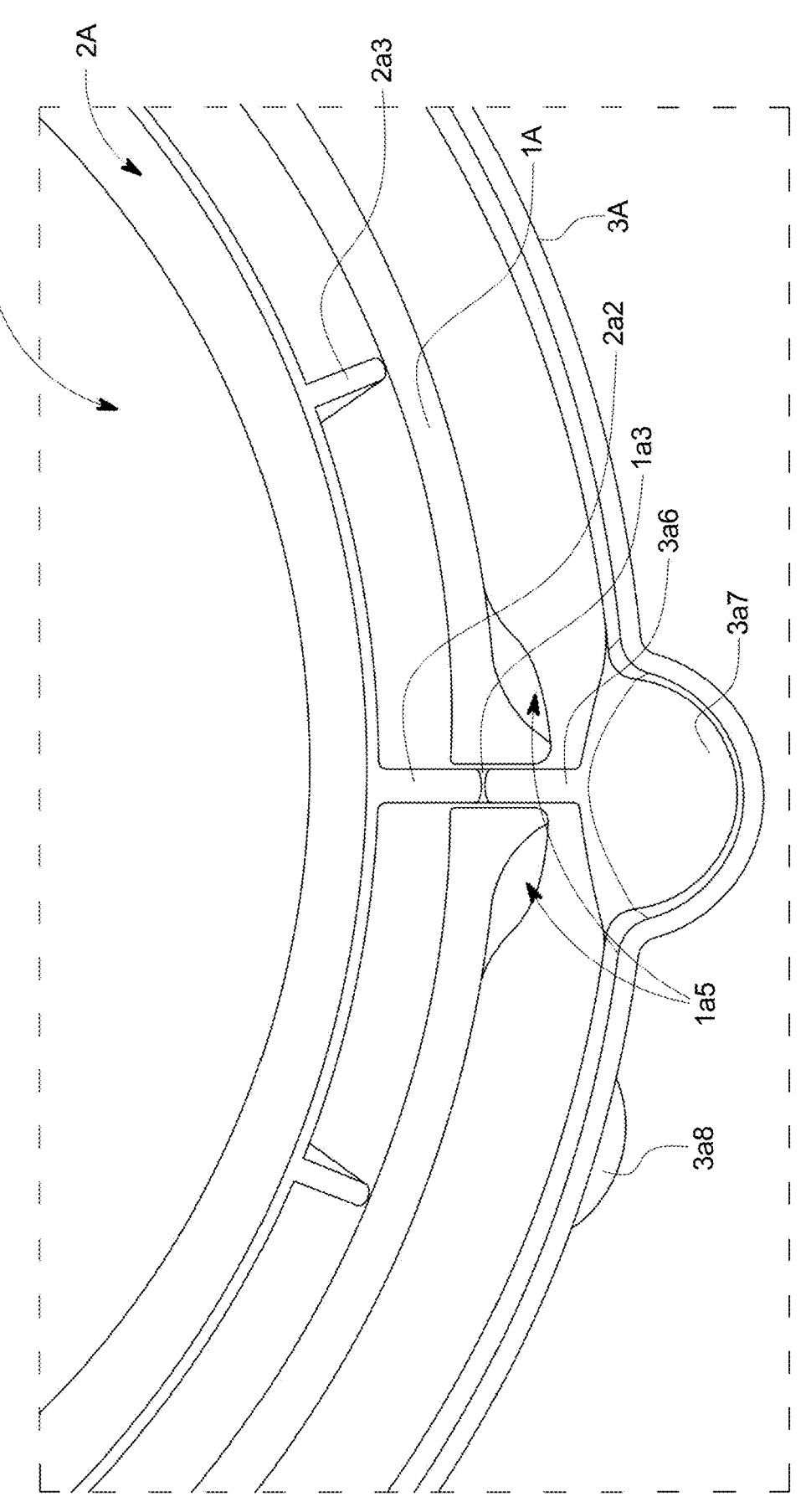
FIG. 15 shows an enlargement of how the tray secures the ring, while the tray is simultaneously secured inside the container.
Figure 16:
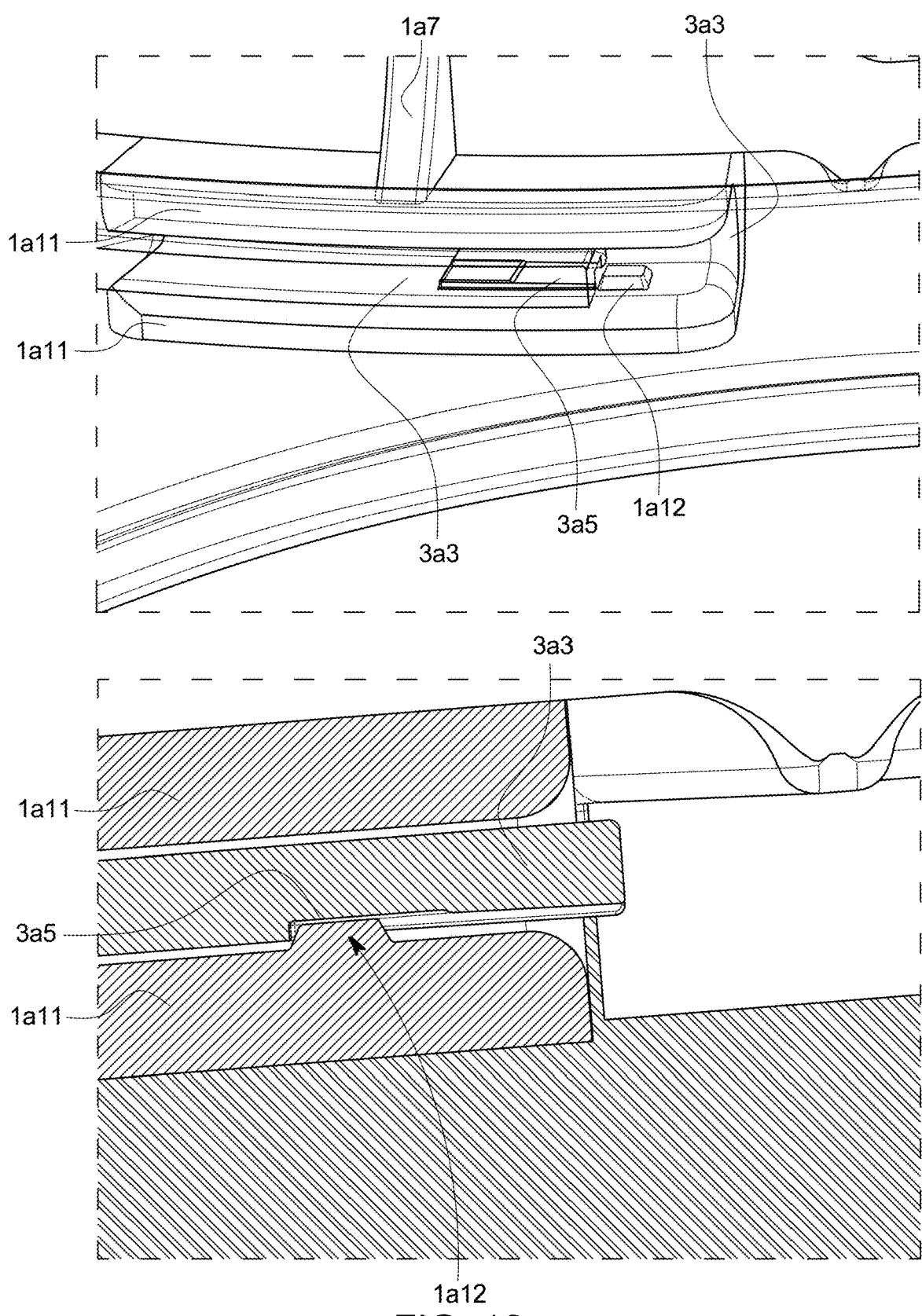
FIG. 16 shows two enlarged views of the locking mechanism between the tray and container.

The non-disposable container 3A is a short cylinder of 21.5 cm (interior diameter) and 7 cm interior height as can be seen most clearly in FIGS. 8 and 9. The container's 3A 67.54 cm interior circumference is divided into four parts. Two opposing sections 40, 42 of approximately 15.47 arc length have the opposing horizontal flanges 3a2, 3a3 extending therefrom, the flanges for supporting, rotating, and locking the tray IA as discussed above. These flanges are 0.5 cm below the rim 44 of the container, allowing the tray's IA floor to be at the same level as the container's rim 44. The other two 18.3 cm sections 46, 48 are dimensioned for the tray IA to be lowered into the container 3A, and secured in place. The flange sections 40, 42 are configured by a rear flange (3a2), a connecting rail (3a1) and lock flange (3a3). The (3.9 cm long, 0.85 cm wide, and 0.25 cm thick) rear and lock flanges 3a3 are where the tray IA rests while locked. The (7.67 cm long, 0.4 cm wide and 0.25 cm thick) rail 3a1 allows the tray's grooves lal0, lall to smoothly transit between the lock and rear flanges 3a3, 3a2. At one edge of each locking flange 3a3, is a groove 3a5 (0.35 cm wide and 0.3 to 0.5 cm deep) that allows the triangular shaped fixture (lal2) of the tray's locking grooves (lall) to slide in and lock the tray IA in place as discussed also above. At the end point of the rear flanges 3a2 there's a 0.2 cm thick horizontal "T" shaped end-stop fixture (3a4) that halts the tray's IA rotation exactly when the lock flanges (3a3) secure it in place.

Two vertical opposing flanges (3a6) protrude from the container's interior wall 50. These flanges are 3a6 designed to slide between the tray's guide-wall gaps (la3) and secure it in place when it is inside the container 3A. They begin 1.8 cm below the edge of the rim 44, and end 1.5 cm before reaching the container's bottom 52. They are (4 cm long, 0.75 cm wide, and 0.25 cm thick). Directly above the container's two vertical flanges (3a6) the container's rim 44 extends outwards (3a7) forming a 2.5 cm long, and 1 cm wide arc. These extensions have a double purpose:

a) they allow the user to reach the tray's lifters (la5) with the tips of thumb and index fingers.
 b) they form spouts to allow liquid to be poured out of the container 3A.
 At the sides of the rim's extensions 3a7, slightly below the rim there is a thumb size "wing" (3a8) that in combination with the wings on the lid (4a3) facilitate opening the container 3A.

The container's bottom exterior has a circular flange (3a9). The flange 3a9 allows it to stack on the lid of another container 3A. It has 13.4 cm as exterior diameter, 0.5 cm tall, 0.2 cm thick.

The non-disposable lid 4A is a covering that adapts to the container's rim 44 contour and prevents any liquids or odors from penetrating into the container 3A. Its exterior surface has an annular segmented flange 4a1 (14.88 cm diameter) made up of four 4.88 cm long arcs. These four arc shaped projections 4a1 are designed to comfortably encircle the container's bottom stacking ring (3a9) enabling it to stack another container 3A on top of it. The spaces between each arc avoid the retention of liquids in its interior. See FIGS. 10 and 11.

The lid 4A has two opposite opening thumb wings (4a3) that are placed above the container's two opening thumb wings (3a8) and work in combination with them to remove the lid.

Referring now to FIGS. 17-28 the disposable embodiment 100 will now be discussed. This embodiment 100 is identical to the non-disposable embodiment 10 except as noted below. The tray IB for embodiment 100 is a thermoformed disc (20.5 cm interior diameter) that is divided into four quadrants 102, 104, 106, 108, allowing for the formation of four or eight slices. Two opposite quadrants 102, 106 are 15.9 cm, and the other two 104, 108 are 16.3 cm. Behind each of the shorter quadrants 102, 106 a (5.3 cm tall, 0.1 cm thick) perpendicular guide-wall lb1 formed of two sections rises. The difference in size between quadrants is also meant to compensate for the thickness of the knives used to slice the flan. See especially FIG. 21.

The tray's walls lb1 are meant to:
 a) guide the mold in place.
 b) keep the ring with its product in place.
 c) allow the user to slice the flan in eight same size slices, as with the non disposable embodiment 10. Please see FIG. 21.

Each of the two sections (lb2) that configure a guide-wall have two 0.3 cm diameter pin-holes (lb5) that match with the plate's pins (5b5) and keep the walls lb1 standing in place. The pin-holes lb5 are placed 3.16 cm below the top edge of each wall section, and 2 cm aside from their center. The tray's bottom pattern 110 matches the container's upper pattern, and allows the tray IB to rest with stability on the container 2B. It also has two pairs of opposite snap-ons features (lb7) that firmly attach it to the container 2B on which it rests.

As with the non-disposable embodiment 10, the ring 2B fills the space left when the mold is removed from the custard portion of the flan, and keep the flan in place when transported. It's frusto-conical, open ended and hollow, shaped to adapt to the shape of the flan custard exterior configuration. See FIG. 24. The upper interior diameter of the ring 2B is 17.6 cm and its bottom interior diameter is 18.1 cm. The top rim has two opposite ergonomic lifters (2b1) that extend 1.35 cm above its upper edge and facilitate raising and lowering it. The lifters 2b1 are 5 cm long at their base and reduce to 3 cm at the top.

Two main 2b2 and four auxiliary 2b3 flanges keep the ring 2B and product in place. The main flanges 2b2 are two exterior, opposite, vertical flanges (5.85 cm long, 1.95 cm wide at the top, 2.5 cm wide at the bottom, and 0.15 cm thick) that run from 1.35 cm above the upper edge of the rim to 0.75 cm before reaching its bottom. They are oppositely placed at 90 degrees from the center of the lifters 2b1 that aid raising and lowering the ring. These main flanges 2b2 insert in the gap lb4 between the tray's walls, impeding the product to wobble or slide inside the tray 1B. The auxiliary flanges 2b3 are also external and vertical. Each pair is placed 22.5 degrees at the sides of the main flanges 2b2, this matches the center of each section of the tray's guide-walls lbl. The flange 2b3s are 4.5 cm long running from the top edge to 0.75 cm before reaching the bottom of the ring 2B. They are 0.378 cm wide at the top, and 0.522 wide at the bottom. Their overall thickness is 0.15 cm.

The disposable container 3B is a 24.06 cm interior diameter thermoformed "disk", with a rim 132 (0.9 cm tall, 1 cm wide at its base) on its circumference. The "U" shaped ridges (3b6) that give it rigidity are extend upwards and serve as a caramel or liquid reservoir, while the flat surfaces 134 (between the ridges) support the tray and attached plate.

There are two pairs of interlocking receptacles 3b4 that allow the tray 1B to snap-on to the container 3B, and secure it in place. These receptacles 3b4 are aligned at the center of the container's drain-pour concavities (3b5) and the plate's spill section (5b3). These interlocking receptacles also fix into place the tray's guide-walls (1b1) and the lid's wings' (4b3) position, as can be seen in FIGS. 26 and 27.

In front of each snap-on of the spill sections 5b3, along the inner, lower, peripheral border of the container's edge, there are two opposite drain/pour concavities (3b5). They allow the caramel or liquids that spill from the tray's plate to reach the bottom of the container 3B, and when the tray IB is removed from the container they also serve to pour them out. The measurements for these concavities are: 2 cm long, 0.5 cm wide, 0.3 cm deep. The snap-on feature discussed above allows the user to turn the tray 1B while attached to the container 3B upside down, position a mold between the tray's guide-walls lbl, and flip it over for the contents of the mold (the custard portion of the flan product) to lower or drop onto the tray's plate. Aligned at the opposite sides of the drain/pour concavities, there are two wings (3b7) on the container's exterior edge. These wings 3b7 in combination with the lid's wings enable the user to easily remove the lid from the container. The measurements of the wings are 2.5 cm long, 1.5 cm wide.

The container's peripheral rim (39) is sized to mate with the lid's, to seal the container 3B to prevent spills, and odors from other nearby foods to contaminate the flan product.

The disposable lid 4B is a covering with a 26.66 cm exterior diameter, 22.63 cm interior diameter, with a 6.7 cm exterior height, and 5.45 cm interior height. The stacking grooves 4b1 match the bottom configuration of the container 3B, allowing a container 3B to securely stack on top of it. 92] The ring's primary 2b2 flanges abut against the lid's interior wall 152, helping to secure the ring 2B in place. The lid's 4B structural design allows the weight of another loaded container on its top; its wings (4b3) in combination with the ones of the container (3b7) facilitate detaching the lid from the container 3B. The lid's peripheral bottom groove (4b4) matches the container's bottom peripheral rim (3b8) securing it in place.

The disposable embodiment plate SB will now be discussed. The plate's purpose is to provide a flat surface positioned over the tray 1B for the flan to rest, and be sliced. It retains a small amount of caramel around the flan, and allows the rest to spill into the bottom of the container. See FIG. 23, and spill-section (5b3). The plate SB is a flat circular surface, two perpendicular opposite wall sections (Sb1) that border the guide walls lb I of the tray IB (when assembled), and two opposite spill-over-sections (5b3). The flat circular surface 160 is where the flan is held in place by the ring 2B, and where it's sliced. The two wall sections (Sb1) are made up of a (0.7 cm tall) rim at its lowest point, that avoids the caramel to spill over this section, and (1.47 cm tall) extensions from where the snap-on pins (5b5) protrude. The two spillover sections (5b3) are formed by a 0.25 cm rim that allows the excess of caramel to spill. When the ring 2B is removed the flan can easily be sliced in half by passing a knife from one indent 5b6 to the opposite indent 5b6 on the plate. If it's then cut from indent to indent (between guide-walls lbl of tray IB) it will be sliced in four equal parts. Finally, if it's cut from the sides of a guide wall to the opposite side of the guide wall that is in front it will be sliced in eight pieces of equal size. See FIG. 23.

The invention claimed is:

1. An apparatus for demolding, slicing, storing, or transporting a food product comprising:

a tray having at least one guide wall, where the guide wall is positioned on the perimeter of the tray, where the tray is sized to receive a solid component as well as a first portion of a liquid component of a food product;

a restraining component sized to restrain the solid component of the food product, where the restraining component is ring shaped, the restraining component having at least one main flange or auxiliary flange which can be used in conjunction with a guide wall of the tray to restrict movement of the restraining component, where the restraining component can couple and decouple to the tray;

a container for receiving and containing a second portion of the liquid component of the food product;

a lid, where the container and lid can be coupled together to enclose both the tray and restraining component, the container having at least one interlocking receptacle or an interlocking flange that can couple to the tray.

2. The apparatus of claim 1 wherein said restraining element is annular and shaped to conform to exterior contours of the solid portion of the food product.

3. The apparatus of claim 1 wherein said tray retains a first portion of said liquid component of the food product and said container retains a second portion of said liquid component of the food product, and said restraining component stabilizes the solid component of the food product.

4. The apparatus of claim 3, wherein the apparatus has a spill section.

5. The apparatus of claim 4 wherein said tray includes guide walls for positioning a cutting instrument for slicing the food product.

* * * * *